United States Patent
Higashi

(10) Patent No.: US 7,556,873 B2
(45) Date of Patent: Jul. 7, 2009

(54) FUEL CELL SYSTEM

(75) Inventor: Shugo Higashi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 753 days.

(21) Appl. No.: 10/550,609

(22) PCT Filed: Mar. 10, 2004

(86) PCT No.: PCT/JP2004/003146

§ 371 (c)(1),
(2), (4) Date: Sep. 23, 2005

(87) PCT Pub. No.: WO2004/086546

PCT Pub. Date: Oct. 7, 2004

(65) Prior Publication Data

US 2006/0246332 A1   Nov. 2, 2006

(30) Foreign Application Priority Data

Mar. 24, 2003   (JP) ............................. 2003-080219

(51) Int. Cl.
*H01M 8/04* (2006.01)
(52) U.S. Cl. .......................................... 429/26; 429/38
(58) Field of Classification Search .................. 429/26, 429/38
See application file for complete search history.

(56) References Cited

U.S. PATENT DOCUMENTS

| | | | |
|---|---|---|---|
| 5,085,949 A * | 2/1992 | Sanderson et al. ............. 429/23 |
| 5,366,821 A | 11/1994 | Merritt et al. | |
| 5,677,073 A * | 10/1997 | Kawatsu ....................... 429/22 |
| 6,596,426 B2 * | 7/2003 | Yang et al. .................... 429/26 |
| 6,682,839 B2 * | 1/2004 | Wilkinson et al. ............ 429/24 |

(Continued)

FOREIGN PATENT DOCUMENTS

JP   59184467 A   * 10/1984

(Continued)

OTHER PUBLICATIONS

Staschewski D et al., "Hydrogen-air PEMFC operation with extraordinarily low gas pressures and internal humidification-conception and experimental prototype stack" vol. 24, No. 6, Jun. 1999, pp. 543-548, XP004164811.

(Continued)

*Primary Examiner*—Gregg Cantelmo
(74) *Attorney, Agent, or Firm*—McDermott Will & Emery LLP

(57) ABSTRACT

Coolant passages (11*a*, 11*b*) are provided in unit cells (17*a*, 17*b*) which form a laminate (170) of the unit cells (17*a*, 17*b*). A coolant supply manifold (12) which distributes coolant from a coolant recirculation device (100) to the coolant passages (11*a*, 11*b*), and a coolant discharge manifold (13) which recovers coolant from the coolant passage (11*a*, 11*b*) to the coolant recirculation device (100), pass through the laminate (170). The coolant supply manifold (12) and coolant discharge manifold (13) are connected by two bypass passages (14*a*, 14*b*). At low temperature, heat transfer from the high temperature parts to the low temperature parts is promoted by shutting off circulation of coolant between the coolant recirculation device (100) and the laminate (170) by a valve (3, 4), and recirculating coolant inside the fuel cell stack (1) via the bypass passages (14*a*, 14*b*).

13 Claims, 25 Drawing Sheets

U.S. PATENT DOCUMENTS

| | | | |
|---|---|---|---|
| 6,686,085 B1 * | 2/2004 | Fujii et al. | 429/39 |
| 7,179,554 B2 * | 2/2007 | Ballantine et al. | 429/13 |
| 2001/0050191 A1 | 12/2001 | Ogawa et al. | |
| 2002/0160239 A1 * | 10/2002 | Cutright et al. | 429/13 |
| 2002/0192521 A1 | 12/2002 | Raiser et al. | |

FOREIGN PATENT DOCUMENTS

| | | |
|---|---|---|
| JP | 63-248073 | 10/1988 |
| JP | 8-111231 | 4/1996 |
| JP | 2002-100392 A | 4/2002 |

OTHER PUBLICATIONS

Staschewski D, "Hydrogen-air fuel cells of the alkaline matrix type: Manufacture and Impregnation of electrodes", vol. 17, No. 8, Aug. 1, 1992, pp. 643-649, XP000321804.

Search Report dated Jun. 12, 2005.

* cited by examiner

100 COOLANT RECIRCULATION DEVICE

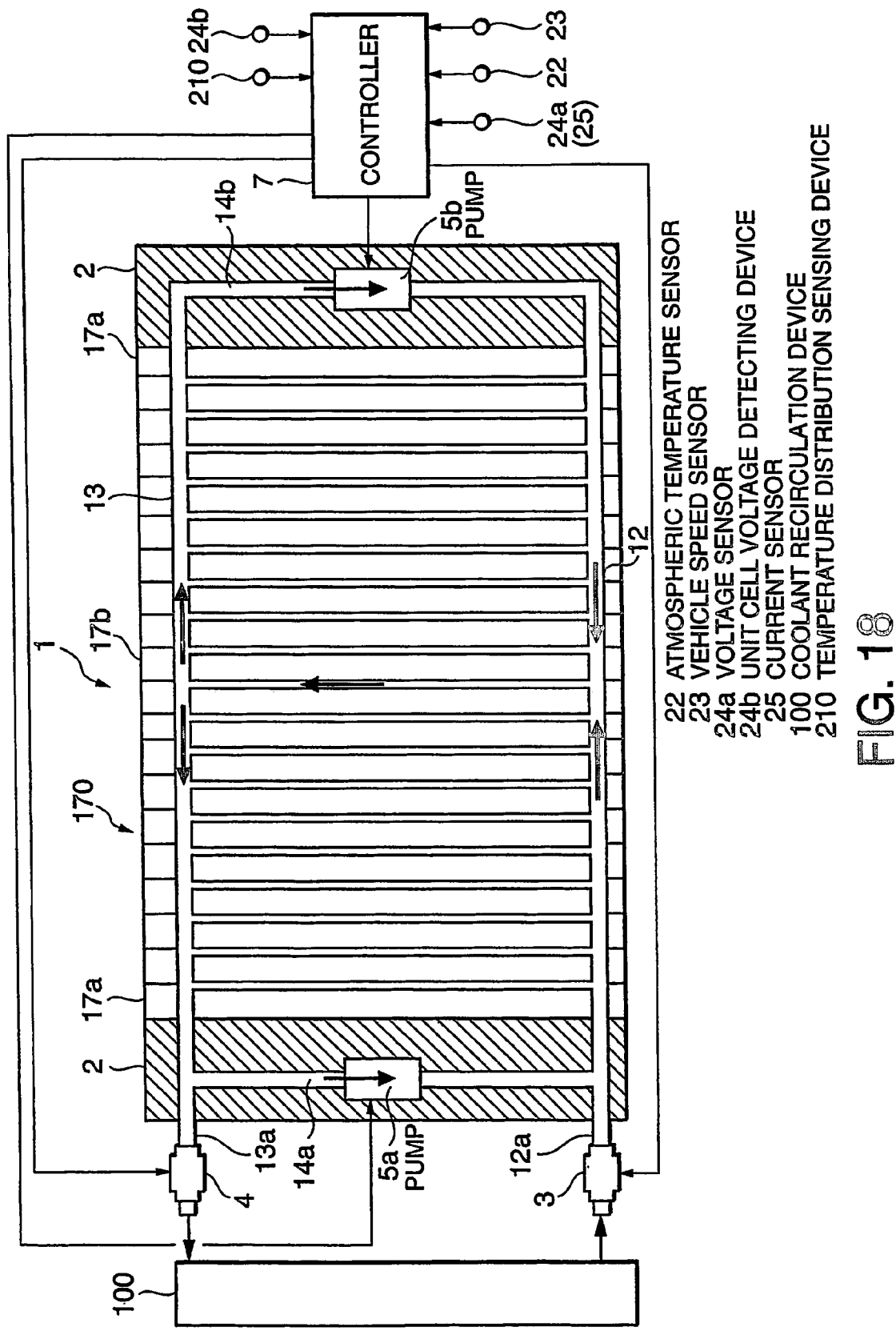

FUEL CELL SYSTEM

RELATED APPLICATION

This application is the U.S. National Phase under 35 U.S.C. §371 of International Application No. PCT/JP2004/003146, filed Mar. 10, 2004, which in turn claims the benefit of Japanese Application No. 2003-080219, filed Mar. 24, 2003, the disclosures of which Applications are incorporated by reference herein in their entirety.

FIELD OF THE INVENTION

This invention relates to temperature control of a fuel cell stack.

BACKGROUND OF THE INVENTION

JP2002-100392A published by the Japan Patent Office in 2002 discloses a fuel cell stack comprising plural unit cells horizontally laminated via separators.

Each unit cell forming the fuel cell stack comprises a solid polymer electrolyte membrane, an anode and a cathode in contact with both sides of the membrane, an anode gas passage facing the anode, and a cathode gas passage facing the cathode. These passages are respectively formed in the separator.

A coolant passage is also formed in the separator. The laminated unit cells are respectively connected to a coolant supply manifold and coolant discharge manifold, both of which penetrate the laminated unit cells. Coolant distributed to these passages via the coolant supply manifold from outside absorbs heat generated by the power generation of each cell, and is then discharged to outside via the coolant discharge manifold.

SUMMARY OF THE INVENTION

When the unit cells start a power generation reaction, they generate heat of reaction. If the fuel cell stack is run under low temperature conditions, the unit cells situated near the center of the laminate rise in temperature at a relatively early stage due to this heat of reaction. On the other hand, the unit cells near the ends of the laminate tend to be influenced by the ambient temperature, and at low temperature, some time is required from startup until the temperature starts to increase.

As a result, a temperature difference arises in the lamination direction in the fuel cell stack oil startup. In order for the fuel cell stack to start steady operation, warm-up of all fuel cells needs to be completed. However, when there is a temperature difference in the lamination direction, the time until warm-up of all fuel cells is completed becomes long, and start of steady running of the fuel cell stack will be retarded by a corresponding delay.

It is therefore an object of this invention to efficiently increase the temperature in a fuel cell stack comprising a laminate of unit cells under low temperature conditions.

In order to achieve the above object, this invention provides a fuel cell system, comprising a laminate of unit cells each of which has a coolant passage, a coolant supply manifold passing through the laminate and distributing coolant from a coolant recirculation device provided outside the laminate to the coolant passages of the unit cells, a coolant discharge manifold passing through the laminate and recovering coolant from the coolant passages of the unit cells to the coolant recirculation device, a valve which shuts off circulation of the coolant between the laminate and the coolant recirculation device, and a bypass passage connecting the coolant supply manifold and the coolant discharge manifold. The bypass passage has a larger cross-section than a cross-section of the coolant passages.

The details as well as other features and advantages of this invention are set forth in the remainder of the specification and are shown in the accompanying drawings.

BRIEF DESCRIPTION OF THE DRAWINGS

FIG. 18 is a schematic diagram including a longitudinal sectional view of a fuel cell stack according to the seventh embodiment of this invention.

DESCRIPTION OF THE PREFERRED EMBODIMENTS

Figure 1:
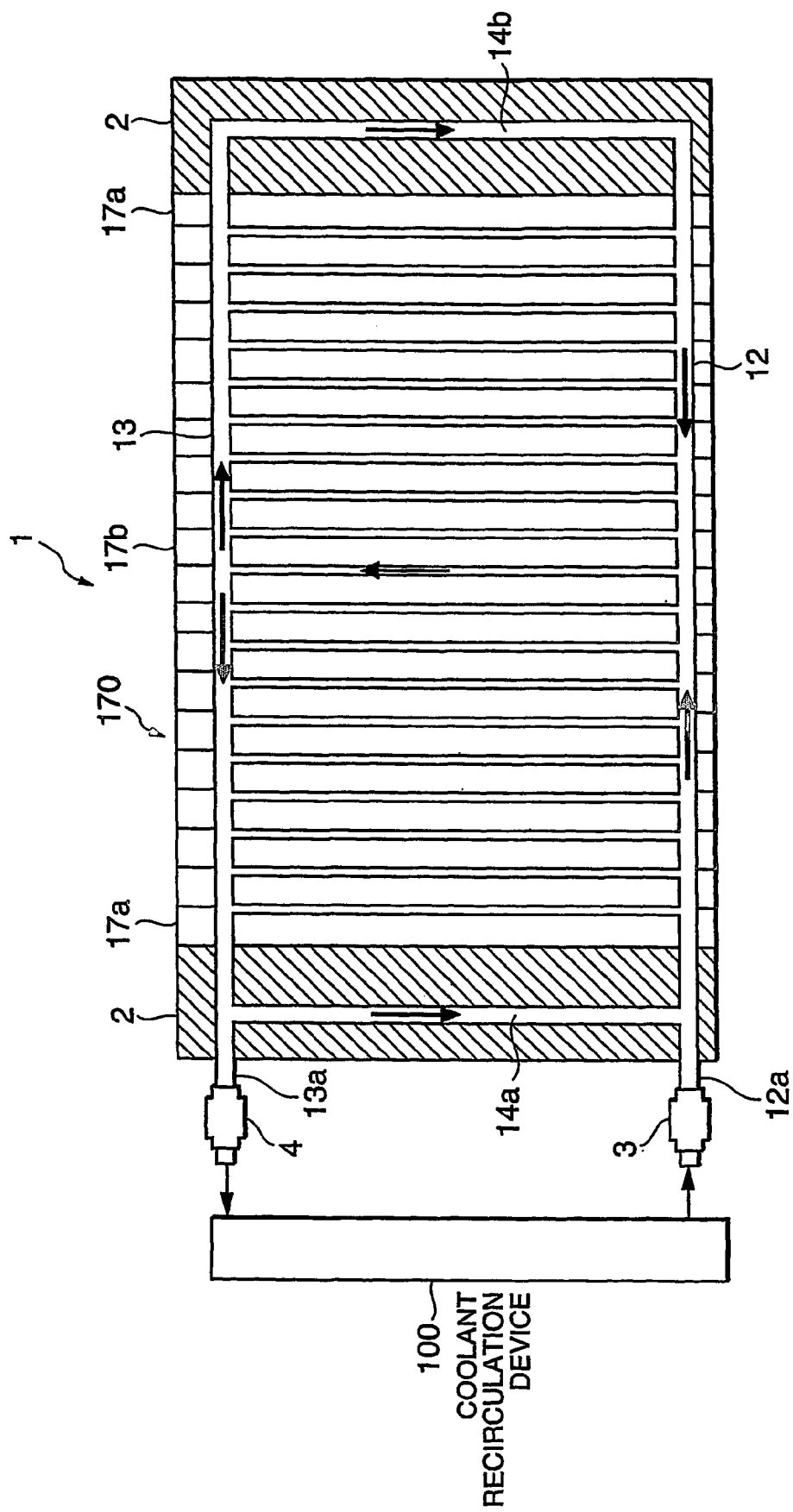
FIG. 1 is a schematic diagram including a longitudinal sectional view of a fuel cell stack according to this invention.

Referring to FIG. 1 of the drawings, a fuel cell stack 1 mounted in a vehicle as drive power source comprises a laminate 170 of plural unit cells 17 superimposed on each other horizontally. The unit cell 17 comprises a polymer electrolyte fuel cell (PEFC), and generates electricity according to an electrochemical reaction of the hydrogen supplied to an anode, and the oxygen supplied to a cathode.

The laminate 170 is gripped by current collectors 2 made of electrically conductive material. Instead of the current collectors 2, the laminate 170 may be gripped by a pair of end plates of a non-conductive material.

The fuel cell stack 1 comprises a coolant supply manifold 12 and a coolant discharge manifold 13 which penetrate through the laminate 170.

Figure 2A:
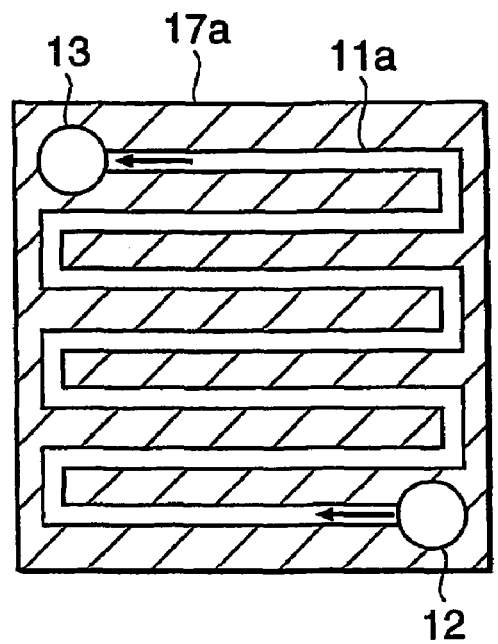
FIGS. 2A and 2B are schematic cross-sectional views of the main parts of the fuel cell stack.
Figure 2B:
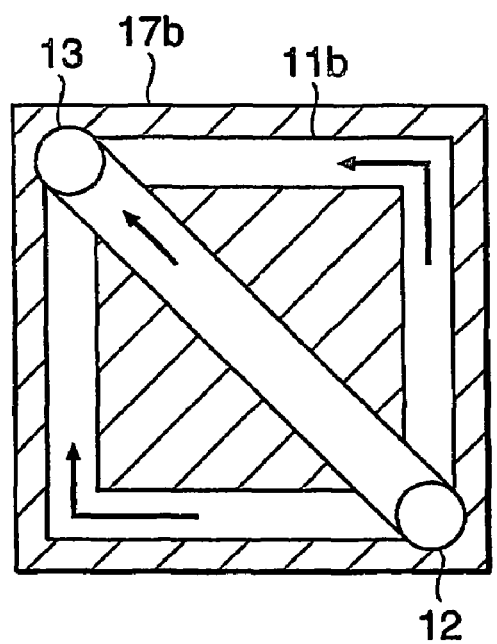

Referring to FIGS. 2A and 2B, the fuel cell stack 1 has a rectangular cross section. In other words, each unit cell 1 has a rectangular plate shape.

The coolant supply manifold 12 and the coolant discharge manifold 13 are formed in positions which make a diagonal line with respect to the cross-section of the rectangular fuel cell stack 1. In the vertical direction, the coolant supply manifold 12 is formed at a lower position than the coolant discharge manifold 13.

Coolant passages 11a or 11b which connect the coolant supply manifold 12 and the coolant discharge manifold 13 are formed in each of the unit cells 17.

The coolant passage 11b is formed of unit cells 17b disposed in the center portion of the laminate 170 in the lamination direction. The coolant passage 11a is formed in unit cells 17a disposed in another portion including ends of the laminate 170.

As shown in FIG. 2A, the coolant passage 11a comprises one passage bent multiple times. One end of the coolant passage 11a is connected to the coolant supply manifold 12, and the other end is connected to the coolant discharge manifold 13.

As shown in FIG. 2B, the coolant passage 11b connects the coolant supply manifold 12 and the coolant discharge manifold 13 by two passages aligned with the circumference of the unit cell 17b, and one passage formed in the direction of a diagonal line. The three passages forming the coolant passage 11b are shorter than the coolant passage 11a, and its cross-section is larger than the cross-section of the coolant passage 11a. The coolant passage 11b is constructed this way in order to promote heat exchange between the unit cells 17b and the coolant, and keep the pressure loss accompanying circulation small.

Referring again to FIG. 1, bypass passages 14a, 14b which directly connect the coolant supply manifold 12 and the coolant discharge manifold 13 are formed in the current collectors 2. The cross-sections of the bypass passages 14a, 14b are set to be larger than the cross-section of the coolant passage 11a, and any of the cross-sections of the three passages forming the coolant passage 11b. Preferably, the cross-sections of the bypass passages 14a, 14b are set to be larger than the total cross-section of the coolant passage 11b.

The coolant supply manifold 12 and the coolant discharge manifold 13 pass through one of the current collectors 2. A supply valve 3 is attached to an end 12a of the coolant supply manifold 12 located outside the fuel cell stack 1, and a drain valve 4 is attached to an end 13a of the coolant discharge manifold 13 located outside the fuel cell stack 1. Coolant is supplied to the coolant supply manifold 12 from a coolant recirculation device 100 via the supply valve 3. The coolant discharged from the coolant discharge manifold 13 is collected by the coolant recirculation device 100 via the drain valve 4. It is also possible to omit one of the valves 3 and 4 according to the specification of the coolant recirculation device 100. The valves 3 and 4 are not necessarily disposed near the current collector 2. One or both of the valves 3 and 4 may be provided at a position distant from the current collector 2.

An anode gas passage and a cathode gas passage are also formed in each fuel cell 17. An anode gas manifold which supplies anode gas to the anode gas passages, and a cathode gas manifold which supplies cathode gas to the cathode gas passages, respectively penetrate the fuel cell stack 1 longitudinally.

Next, the operation of the fuel cell stack 1 when it is at low temperature, will be described.

Herein, antifreeze solution is used as the coolant. Water may be used as the coolant when a thawing device is provided.

First, the supply valve 3 is opened and the coolant supply manifold 12, the coolant passages 11a and 11b, the bypass passages 14a and 14b, and the coolant discharge manifold 13 are filled with coolant. Once these are filled by coolant, the supply valve 3 is closed. The drain valve 4 must be closed beforehand.

Next, anode gas is supplied to the anode via the anode gas manifold, and cathode gas is supplied to the cathode via the cathode gas manifold. Herein, hydrogen is supplied as the anode gas, and air is supplied as the cathode gas. As a result, a power generation reaction is started by each unit cell 17, and the temperature of each unit cell 17 rises due to the heat generated by the power generation reaction.

As the unit cells 17a are situated on both sides, the unit cells 17b near the center of the fuel cell stack 1 cannot be easily influenced by the outside air. Therefore, the unit cells 17b increase in temperature earlier than the unit cells 17a due to generation of heat. On the other hand, the unit cells 17a situated at both ends of the laminate 170 tend to be influenced by the outside air, and the adjoining current collectors 2 do not generate heat. Therefore, the temperature rise of the unit cells 17a at the ends is later compared with the unit cells 17b in the center.

If the coolant temperature of the unit cells 17b situated in the center rises, the coolant of the coolant passage 11b in the cell will expand, and the coolant which expanded will overflow from the upper end of the coolant passage 11b to the coolant discharge manifold 13. As a result, the coolant of the coolant discharge manifold 13 is extruded to the bypass passages 14a and 14b.

Although at this time, some coolant in the coolant discharge manifold 13 also flows into the coolant passages 11a of the unit cells 17a outside the center, the pressure loss when the coolant circulates through the bypass passages 14a, 14b is much less than the pressure loss when it circulates through the coolant passage 11a, so coolant extruded from the coolant discharge manifold 13 mainly flows into the bypass passages 14a, 14b. In the bypass passages 14a and 14b, the flow of coolant is accelerated by gravity. The coolant which flowed out of the bypass passages 14a and 14b into the coolant supply manifold 12, returns to the coolant passages 11b formed in the unit cells 17b. As the coolant passages 11b are shorter and have larger cross-sections than the coolant passages 11a, the pressure loss when the coolant circulates in the coolant passage 11b is much less than the pressure loss when it circulates through the coolant passages 11a. Therefore, the coolant of the coolant supply manifold 12 mainly flows into the coolant passages 11b.

As a result, as shown in FIG. 1 by the arrow, coolant is recirculated from the coolant passages 11b via the coolant discharge manifold 13, the bypass passages 14a, 14b and the coolant supply manifold 12 to return to the coolant passages 11b.

As mentioned above, the rise in heat accompanying the start of the power generation reaction is larger in the unit cells 17b than in the unit cells 17a. The circulation of coolant therefore has the effect of transferring heat from the unit cells 17 in the vicinity of the center which have a large temperature rise, to the unit cells 17a at the ends which have a small temperature rise. As heat is transmitted upwards, the circulation direction of coolant and its transfer direction of heat correspond, and a desirable heat transmission effect is obtained.

As the bypass passages 14a, 14b were formed in the current collector 2, low temperature atmospheric air cannot easily affect the coolant circulating through the inside of the fuel cell stack 1, and temperature drop of the coolant due to atmospheric air can be prevented. The forming of the bypass passages 14a, 14b in the current collector 2 which does not contain other passages, is preferred from the viewpoint of ensuring freedom of design of the bypass passages 14a, 14b.

Figure 3:
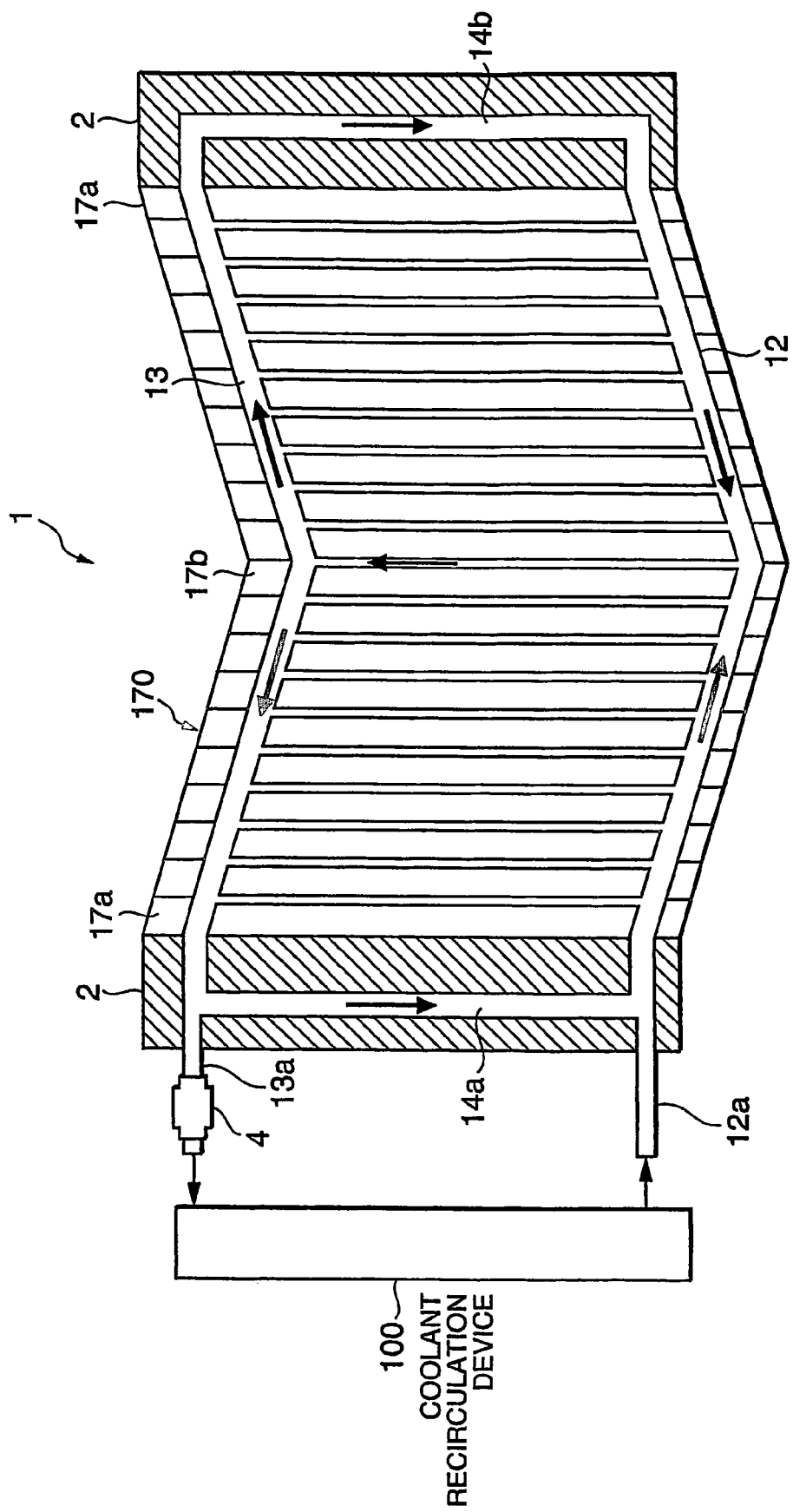
FIG. 3 is a schematic diagram including a longitudinal sectional view of a fuel cell stack according to a second embodiment of this invention.

Next, referring to FIG. 3, a second embodiment of this invention will be described.

In this embodiment, the center part of the fuel cell stack 1 is bent so that, when the fuel cell stack 1 is viewed from the side, it appears to have a V shape. In this embodiment, although the shape of the fuel cell stack 1 is bent directly from the center to the ends, the change in shape is not necessarily linear. The coolant supply manifold 12 and the coolant discharge manifold 13 are also bent in the center according to the shape of the fuel cell stack 1.

In this embodiment, the supply valve 3 of the first embodiment is omitted. However, it is also possible to provide an identical supply valve 3 to that of the first embodiment in the coolant supply manifold 12. The remaining construction is identical to that of the first embodiment.

In this embodiment, if the fuel cell stack 1 is operated at low temperature, the coolant supply manifold 12, coolant passages 11a, 11b, bypass passages 14a, 14b and the coolant discharge manifold 13 are first filled with coolant as in the first embodiment. Next, the drain valve 4 is closed. Next, anode gas is supplied to the anode via the anode gas manifold, and cathode gas is supplied to the cathode via the cathode gas manifold.

When a power generation reaction is started by the unit cells 17, the unit cells 17b in the center will reach a higher temperature than the unit cells 17a at the ends. As a result, the coolant in the coolant passages 11b in the warmed unit cells 17b overflows to the upper coolant discharge manifold 13 due to volumetric expansion as in the first embodiment. Heat spreads also inside the coolant. The coolant discharge manifold 13 is bent in a V shape, and since heat is propagated upwards, the transfer of the heat of the coolant is promoted by the coolant discharge manifold 13 bent in a V shape in this way.

The coolant overflowing to the coolant discharge manifold 13 extrudes coolant from the coolant discharge manifold 13 to the bypass passages 14a and 14b. In the bypass passages 14a and 14b, coolant moves downwards due to gravity, and coolant is extruded to the coolant supply manifold 12 in the lower part of the bypass passages 14a and 14b.

In passing from the coolant discharge manifold 13 to the bypass passages 14a, 14b, due to heat exchange with the unit cells 17a at the ends and the current collectors 2, the coolant warms the unit cells 17a at the ends and the current collectors 2, while its own temperature falls. In the lower part of the bypass passages 14a and 14b, the volume of cooling water contracts due to the temperature drop.

The coolant which flowed into the coolant supply manifold 12 moves towards the lowest, center part of the coolant supply manifold 12, which is bent in a V shape in the center.

Thus, as in the first embodiment, coolant circulates from the coolant passage 11b via the coolant discharge manifold 13, the bypass passages 14a, 14b and the coolant supply manifold 12 back to the coolant passage 11b. According to this embodiment, as both the coolant discharge manifold 13 and the coolant supply manifold 12 are bent in a V shape in the center, transfer of heat and coolant are further promoted.

In the first embodiment, when the coolant discharge manifold 13 and the coolant supply manifold 12 are formed horizontally, movement of the coolant in these manifolds must be based on the pressure head of coolant itself. In this embodiment, as compared with the first embodiment, gravity can be more efficiently used for circulation of coolant.

Next, referring to FIGS. 4-8, a third embodiment of this invention will be described.

Figure 4:
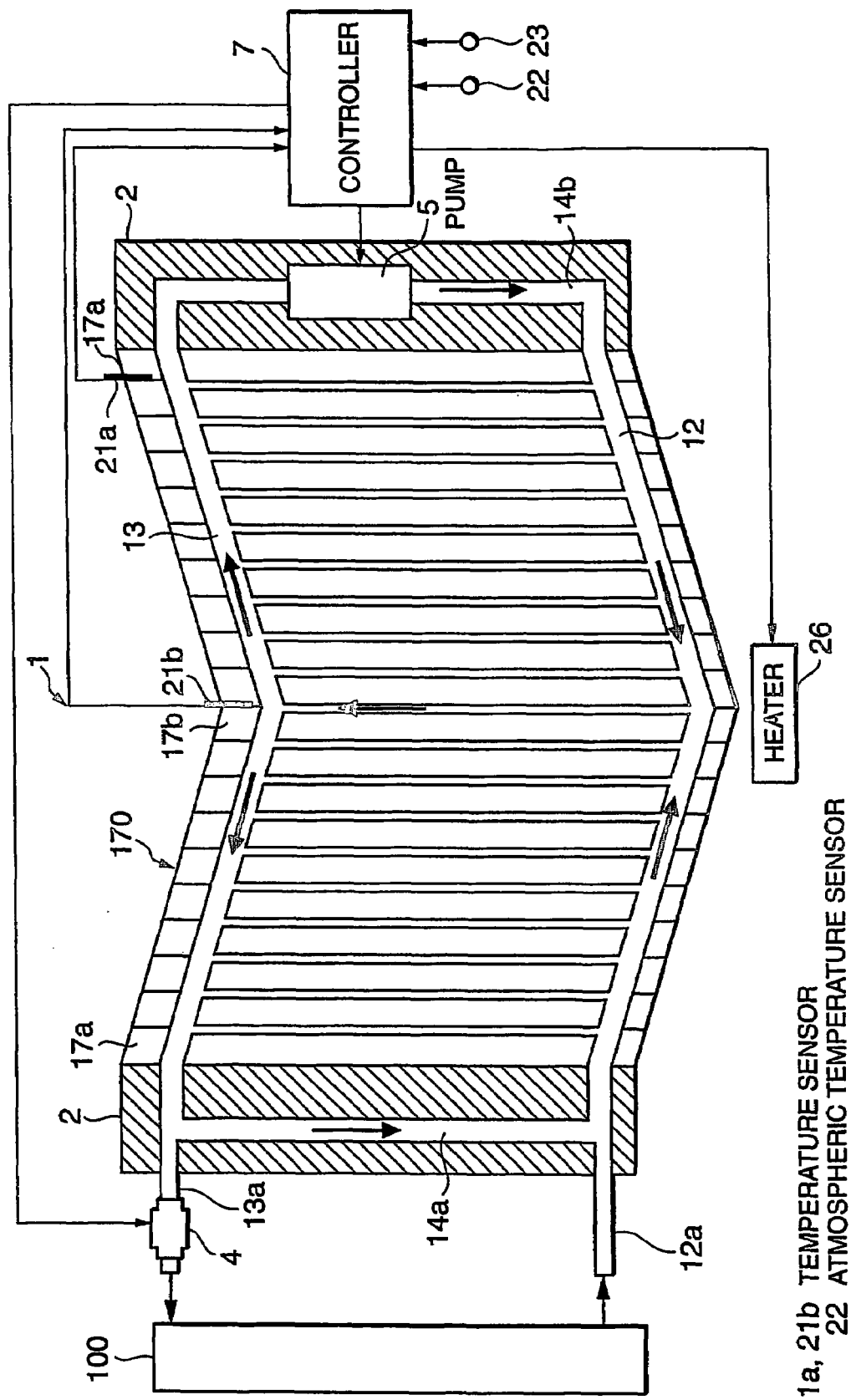
FIG. 4 is a schematic diagram including a longitudinal sectional view of a fuel cell stack according to a third embodiment of this invention.

First, referring to FIG. 4, a fuel cell stack 1 according to this embodiment is bent in a V shape in the center as in the second embodiment, but it further comprises a pump 5 which accelerates circulation of the coolant in the bypass passage 14b, in the current collector 2 more distant from the drain valve 4. The pump 5 is preferably formed in a position with the least pressure loss.

A heater 26 is provided near the coolant supply manifold directly under the cells 17b in the center. When the fuel cell stack 1 is used in a reforming type fuel cell power plant, it is also preferred to provide components which generate heat due to their operation, such as a reformer and combustor, instead of the heater 26.

In this embodiment, a controller 7 is further provided for performing the operation of the drain valve 4, pump 5 and heater 26. The controller 7 comprises a microcomputer provided with a central processing unit (CPU), read-only memory (ROM), random-access memory (RAM) and I/O interface. It is also possible to form the controller from plural microcomputers.

The fuel stack 1 comprises a temperature sensor 21a which detects the temperature of the unit cells 17a at the ends of the fuel cell stack 1, and a temperature sensor 21b which detects the temperature of the unit cells 17b in the center. A thermometer or a thermocouple can be used for these temperature sensors 21a and 21b. The detection temperatures of these sensors are inputted into the controller 7 as signals, respectively.

Signals which express detection values are further input to the controller 7 respectively from a temperature sensor 22 which detects the atmospheric temperature outside the vehicle, and a vehicle speed sensor 23 which detects the vehicle running speed.

Next, referring to FIGS. 5-8, the temperature control routines performed by the controller 7 based on the detection signals of these sensors, when the fuel cell stack 1 stops operating, when the fuel cell stack starts to operate, and when the fuel cell stack 1 is operating in a steady state, will be described.

Figure 5:
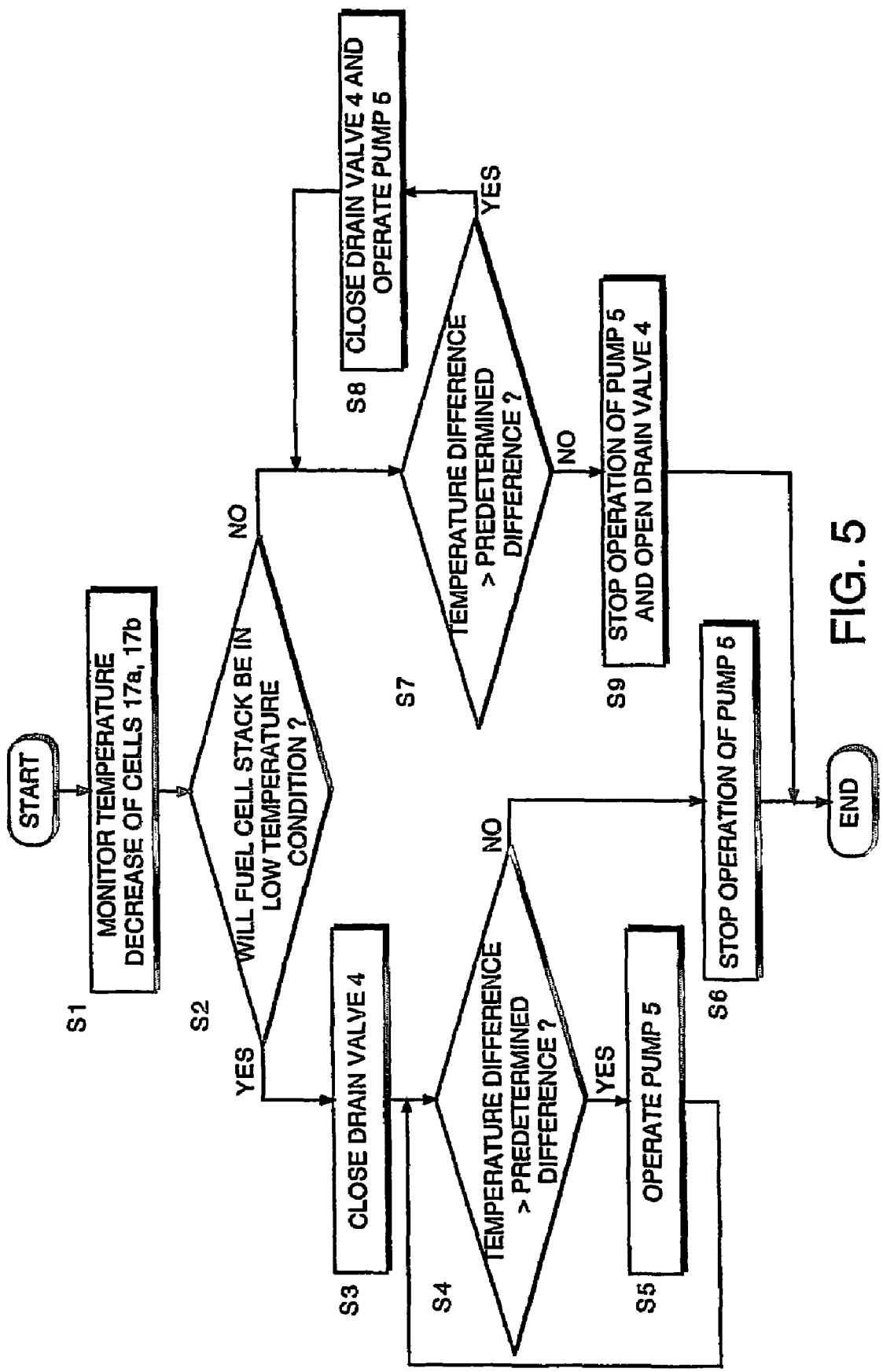
FIG. 5 is a flow chart describing a temperature control routine performed by a controller according to the third embodiment of this invention.

FIG. 5 shows the temperature control routine performed by the controller 7 when the fuel cell stack 1 stops operating. This routine is performed once on each occasion when the fuel cell stack 1 stops power generation.

First, in a step S1, the controller 7 monitors the temperature of the unit cells 17b in the center and the temperature of the unit cells 17a at the ends detected by the temperature sensors 21a and 21b over a fixed period.

In a following step S2, the controller 7 estimates whether or not the fuel cell stack 1 will fall to low temperature after power generation stops. This estimation is performed based on the temperature change of the unit cells 17a at the ends over a fixed period. When the temperature decrease width of the unit cells 17a over the fixed period exceeds a predetermined width, it is estimated that the fuel cell stack 1 will fall to low temperature. The predetermined width is set beforehand by experiment by calculating a temperature decrease rate when the fuel stack drops to a temperature at which warm-up operation is required when it is restarted.

The reason why the temperature of the unit cells 17a at the ends is used for this estimation, is that the unit cells 17a at the ends tend to be influenced by the outside atmosphere more than the unit cells 17b in the center. It Is also preferred to estimate whether or not the fuel cell stack 1 will fall to low temperature from the change in the temperature difference between the unit cells 17a at the ends and the unit cells 17b in the center by comparing the detection temperatures of the temperature sensor 21a and temperature sensor 21b.

Alternatively, more simply, the estimation of whether or not the fuel cell stack 1 will fall to low temperature may be performed based on the outside atmospheric temperature detected by the temperature sensor 22.

If the estimation result of the step S2 is affirmative, i.e., when it is estimated that the fuel cell stack 1 will fall to low temperature, in a step S3, the controller 7 closes the drain valve 4.

In a following step S4, the controller 7 determines whether or not the temperature difference between the temperature of the unit cells 17b in the center and the temperature of the unit cells 17a at the ends, has exceeded a predetermined temperature difference. When the temperature difference is larger than the predetermined temperature difference, the controller 7, in a step S5, operates the pump 5.

When the pump 5 starts operation, coolant circulates between the coolant supply manifold 12 and the coolant discharge manifold 13 mainly via the bypass passages 14a, 14b and the coolant passages 11b of the unit cells 17b, so that the temperature of the unit cells 17b in the center and the temperature of the unit cells 17a at the ends is equalized.

After the processing of the step S5, the controller 7 repeats the step S4.

Therefore, operation of the pump 5 is performed continuously until the determination result of the step S4 becomes negative, i.e., until the temperature difference between the temperature of the unit cells 17b in the center and the temperature of the unit cells 17a at the ends no longer exceeds the predetermined temperature difference.

If the determination result of the step S4 is negative, the controller 7, in the step S6, stops operation of the pump 5. After the processing of the step S6, the controller 7 terminates the routine.

On the other hand, if the estimation result of the step S2 is negative, i.e., it is determined that the fuel cell stack 1 will not fall to low temperature, in a step S7, the controller 7 determines whether or not the temperature difference between the temperature of the unit cells 17b in the center and the temperature of the unit cells 17a at the ends has exceeded the predetermined temperature difference in the same way as in the step S4.

When the temperature difference has exceeded the predetermined temperature difference, in a step S8, the controller 7 closes the drain valve 4 and operates the pump 5.

After the processing of the step S8, the controller 7 repeats the determination of the step S7.

Therefore, the operation of the pump 5 is performed continuously until the determination result of the step S7 becomes negative, i.e., until the temperature difference between the temperature of the unit cells 17b in the center and the temperature of the unit cells 17a at the ends no longer exceeds the predetermined temperature difference.

If the determination result of the step S7 is negative, the controller 7 stops operation of the pump 5 in a step S9. After the processing of the step S9, the controller 7 terminates the routine.

According to this routine, the operation of the pump 5 is performed on each occasion the fuel cell stack 1 stops generating power until the temperature difference between the temperature of the unit cells 17b in the center and the temperature of the unit cells 17a at the ends no longer exceeds the predetermined temperature difference, so as to equalize the temperature inside the fuel cell stack 1. This temperature equalization has the effect of preventing damage to the fuel cell stack 1 due to thermal distortion.

When it is predicted that, after a power generation stop, the fuel cell stack 1 will fall to low temperature, the drain valve 4 remains completely closed also even after temperature equalization processing. This measure is to prevent the warm-up operation on startup from being obstructed by the drain valve 4 if it has frozen.

Figure 6:
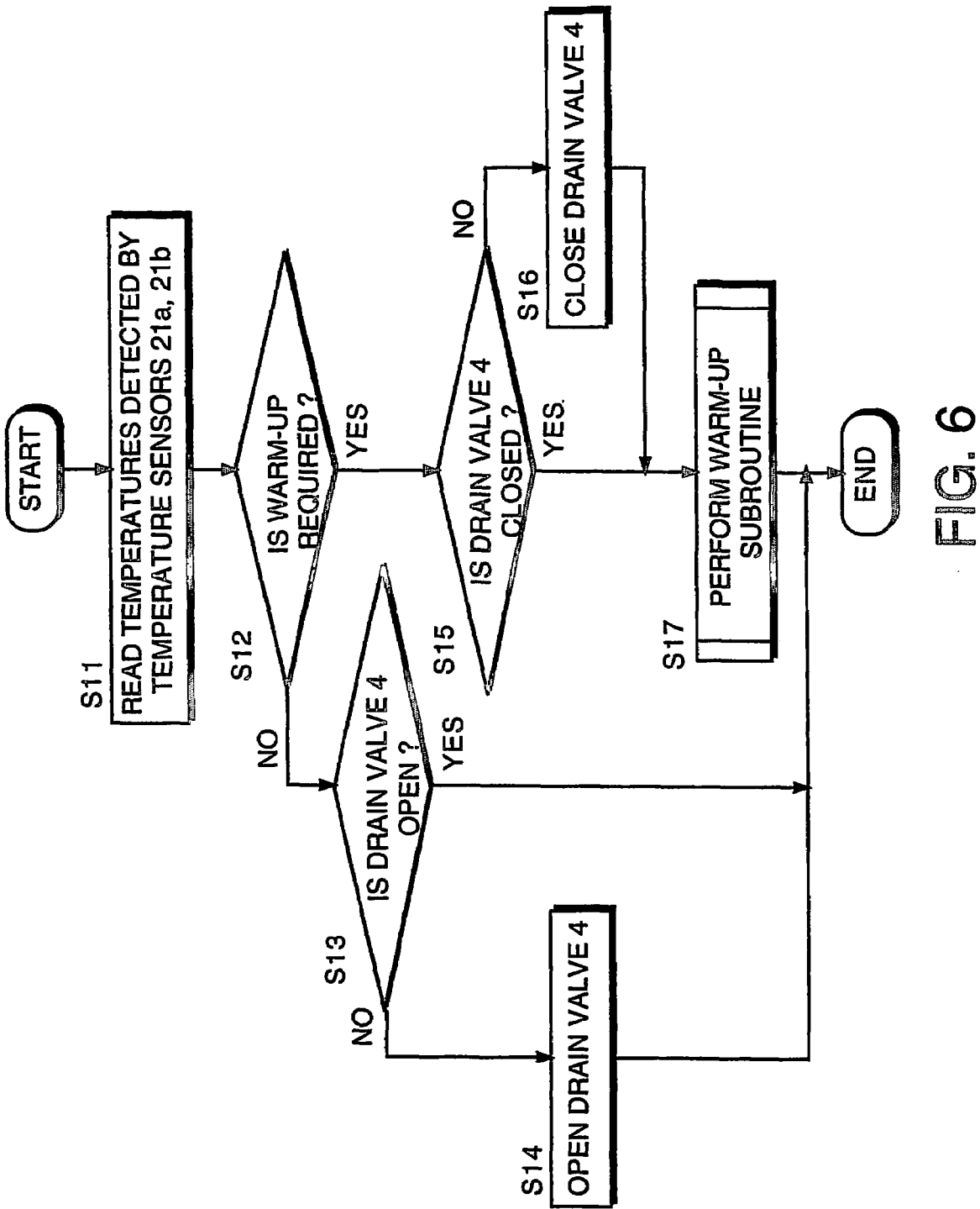
FIG. 6 is a flow chart describing a temperature control routine performed by the controller according to the third embodiment of this invention, when the fuel cell stack starts operating.

FIG. 6 shows the temperature control routine performed by the controller 7 when the fuel cell stack 1 starts. This routine is performed once on each occasion when it is estimated that the fuel cell stack 1 will start such as when the ignition switch of the vehicle is turned on, or when the door lock of the vehicle is released.

First, in a step S11, the controller 7 reads the temperatures detected by the temperature sensors 21a, 21b.

In a next step S12, the controller 7 determines whether or not a warm-up operation of the fuel cell stack 1 is required based on the detected temperatures.

The determination as to whether or not a warm-up operation is required, is preferably performed based on the average detection temperature of the temperature sensors 21a and 21b, but it is also possible to determine whether or not the warm-up operation is required based solely on the detection temperature of the temperature sensor 21a.

When the vehicle has stopped for a long time, the temperature of the fuel cell stack 1 becomes almost equal to the outside atmospheric temperature, so it may also be determined whether or not a warm-up operation is required based on the outside atmospheric temperature detected by the temperature sensor 22.

When the warm-up operation is required, the controller 7 then determines in a step S15 if the drain valve 4 is closed.

When the drain valve 4 is not closed in the step S15, the controller 7 closes the drain valve 4 in a step S16, and performs a warm-up subroutine in a step S17.

When the drain valve 4 is closed in the step S15, the controller 7 skips the step S16 and immediately performs the warm-up subroutine in the step S17.

The warm-up subroutine will be described later. After the operations of the step S17, the controller 7 terminates the temperature control routine When the warm-up operation is not required in the step S12, the controller 7 determines in a step S13 if the drain valve 4 is open, and when the drain valve 4 is open, the controller 7 terminates the temperature control routine without doing anything.

When the drain valve 4 is not open, the controller 7 terminates the routine after opening the drain valve 4 in a step S14.

Next, referring to FIG. 7, the warm-up subroutine on startup performed by the controller 7 in the step S14 will be described. During execution of this subroutine, hydrogen is supplied to the anode and air is supplied to the cathode of the fuel cell stack 1.

First, in a step S21, the controller 7 starts operation of the pump 5.

In a following step S22, the controller 7 monitors the temperature of the unit cells 17b in the center detected by the temperature sensor 21b over a definite time period, and calculates the temperature increase rate.

In a following step S23, the controller 7 determines whether or not the temperature increase rate of the unit cells 17b has exceeded a predetermined rate.

If the temperature increase rate of the unit cells 17b is less than the predetermined rate, in a step S24, the controller 7 reduces the discharge flow rate of the pump 5 by a fixed amount. When the discharge flow rate of the pump 5 has fallen to a minimum discharge flow rate, the minimum discharge flow rate is maintained.

After the processing of the step S24, the controller 7 repeats the processing of the steps S22 and S23.

When it is determined in the step S23 that the temperature change of the unit cells 17b over a fixed time period has exceeded the predetermined rate, in a step S25, the controller 7 increases the discharge flow rate of the pump 5 by a fixed amount.

In a following step S26, the controller 7 compares the discharge flow rate of the pump 5 with a predetermined flow rate a and if the discharge flow rate of the pump 5 is less than the predetermined flow rate $\alpha$, the controller 7 repeats the processing of the steps S22-S26.

In the step S26, when the discharge flow rate of the pump 5 is more than the predetermined flow rate $\alpha$, in a step S27, the controller 7 calculates a temperature difference between the temperature of the unit cells 17a at the ends of the fuel cell stack 1 detected by the temperature sensor 21a, and the temperature of the unit cells 17b in the center detected by the temperature sensor 21b.

In a following step S28, it is determined whether or not the temperature difference has exceeded a predetermined temperature difference. This predetermined temperature difference is a value for keeping the difference between the warm-up completion time of the unit cells 17b in the center and the unit cells 17a at the end of the fuel cell stack 1 within a tolerance range, and is set experimentally beforehand.

When the temperature difference has exceeded the predetermined temperature difference, the controller 7 performs the processing of a step S30. When the temperature difference has not exceed the predetermined temperature difference, in a step S29, the controller 7 increases the opening of the drain valve 4 by a predetermined amount A %.

Increasing the opening of the drain valve 4 causes an increase in the coolant amount circulating through the fuel cell stack 1. It also means that the heat in the fuel cell stack 1 is transported outside. When the coolant recirculation device 100 warms up auxiliary devices other than fuel cell stack 1, the heat of the fuel cell stack 1 can be used for warm-up of these auxiliary devices by opening the drain valve 4.

After the processing of the step S29, the controller 7 performs the processing of the step S30.

In the step S30, the controller 7 reads the temperature of the unit cells 17b in the center detected by the temperature sensor 21b.

In a following step S31, the controller 7 compares the temperature of the unit cells 17b with a predetermined temperature. The predetermined temperature used for the determination of the step S31 is the minimum temperature required to satisfy the power generation demand of the fuel cell stack 1. The predetermined temperature is therefore set beforehand according to the power generation demand of the fuel cell stack 1.

If the controller 7 controls the power generation amount of the fuel cell stack 1, the power generation demand of the fuel cell stack 1 is a value known by the controller 7. When another controller controls the power generation amount of the fuel cell stack 1, the power generation demand is inputted into the controller 7 as a signal from the other controller.

When the temperature of the unit cells 17b in the center has not reached the predetermined temperature in the step S31, the controller 7, in a step S32, reduces the opening of the drain valve 4 by a predetermined amount B %. If the opening of the drain valve 4 decreases, the amount of heat transferred from the fuel cell stack 1 to the outside will decrease, which leads to a temperature rise of the fuel cell stack 1.

After the processing of the step S32, the controller 7 repeats the processing of the steps S27-S31.

Thus, if the temperature of the unit cells 17b in the center reaches the predetermined temperature in the step S31, the controller 7, in a step S33, determines whether or not the drain valve 4 has reached full open.

When the drain valve 4 has not reached full open, the controller 7 repeats the processing of the steps S27-S32.

When the drain valve 4 has reached full open, the controller 7, in a step S34, stops operation of the pump 5. After the processing of the step S34, the controller 7 terminates the subroutine.

According to the above process, when the fuel cell stack 1 starts up at low temperature, the controller 7 gradually increases the discharge flow rate of the pump 5 while preventing the temperature rise of the unit cells 17a from falling below a predetermined rate with the drain valve 4 still closed.

After the discharge flow rate of the pump 5 reaches the predetermined flow rate $\alpha$, the drain valve 4 is opened little by little. The opening of the drain valve 4 is increased according to the decrease of temperature difference between the unit cells 17a and 17b.

At the same time, the opening of the drain valve 4 is reduced as the temperature of the unit cells 17b falls below the predetermined temperature corresponding to the minimum power generation demand of the fuel cell stack 1.

Finally, the drain valve 4 is fully opened when the temperature difference of the unit cells 17a and 17b, and the temperature of the whole fuel cell stack 1 represented by the temperature of the unit cells 17b, are both suitable for normal operation.

This control of the discharge flow rate of the pump 5 and drain valve 4 realizes efficient warm-up of the fuel cell stack 1.

Figure 8:
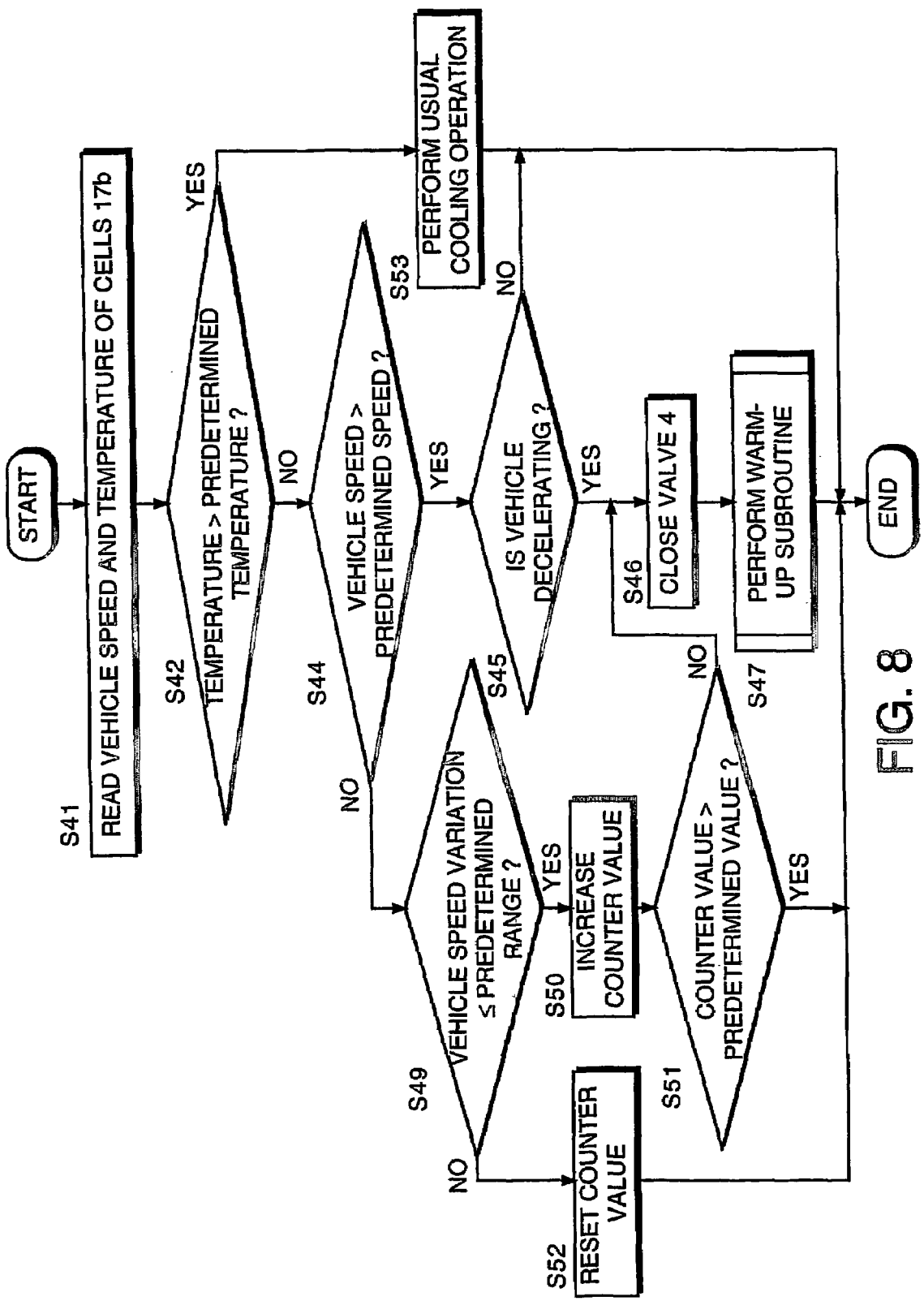
FIG. 8 is a flow chart describing a temperature control routine performed by the controller according to the third embodiment of this invention during operation of the fuel cell stack.

FIG. 8 shows the temperature control routine performed by the controller 7 during normal operation of the fuel cell stack 1. This routine is performed at an interval of a hundred milliseconds, after the fuel cell stack 1 starts power generation following termination of the temperature control routine during startup of FIG. 6.

First, in a step S41, the controller 7 reads the vehicle speed detected by the vehicle speed sensor 23, and the temperature of the unit cells 17b in the center detected by the temperature sensor 21b.

In a next step S42, the controller 7 determines whether or not the temperature of the unit cells 17b is higher than a predetermined temperature. The predetermined temperature is an optimum temperature according to the power generation demand of the fuel cell stack 1. Specifically, the predetermined temperature is a value obtained by adding a constant temperature to the predetermined temperature applied in the step S31 of FIG. 8.

When the temperature of the unit cells 17b is higher than the predetermined temperature, in a step S53, the controller 7 performs a usual coolant recycle operation. The usual coolant recycle operation means that the coolant recirculation device 100 runs according to specification while the drain valve 4 is fully opened.

When the temperature of the unit cells 17b is higher than the predetermined temperature, it is not necessary to warm up the fuel cell stack 1, and if the opening of the drain valve 4 is reduced for warm-up, the cooling performance of the fuel cell stack 1 will fall. Therefore, in this case, the usual coolant recycle operation is performed.

After the processing of the step S53, the controller 7 terminates the routine.

When the temperature of the unit cells 17b is not higher than the predetermined temperature, the controller 7 determines whether or not the vehicle running condition is suitable for warm-up of the fuel cell stack 1 by the following procedure. During power generation by the fuel cell stack 1, the fuel cell stack 1 normally generates heat, and in order to maintain the fuel cell stack 1 at the proper temperature, the fuel cell stack 1 is usually cooled by the coolant recirculation device 100. Therefore, warm-up of the fuel cell stack 1 during power generation of the fuel cell stack 1 is limited to certain cases.

First, it is determined in a step S44 whether or not the vehicle speed is larger than a predetermined vehicle speed. The predetermined vehicle speed is 10 km/hour.

When the vehicle speed is larger than the predetermined vehicle speed, in a step S45, the controller 7 determines whether or not the vehicle is decelerating. This determination is performed by comparing the vehicle speed detected on the immediately preceding occasion the routine was executed, with the vehicle speed detected on the present occasion.

When the vehicle is not decelerating, the controller 7 terminates the routine without performing other processing. When the vehicle is not decelerating, even if the determination result of the step S42 is negative, it is estimated that the temperature of the fuel cell stack 1 will rise because the fuel cell stack 1 continues to generate power. Therefore, warm-up operation is not performed in this case.

When the vehicle is decelerating, in a step S46, the controller 7 closes the drain valve 46.

Figure 9:
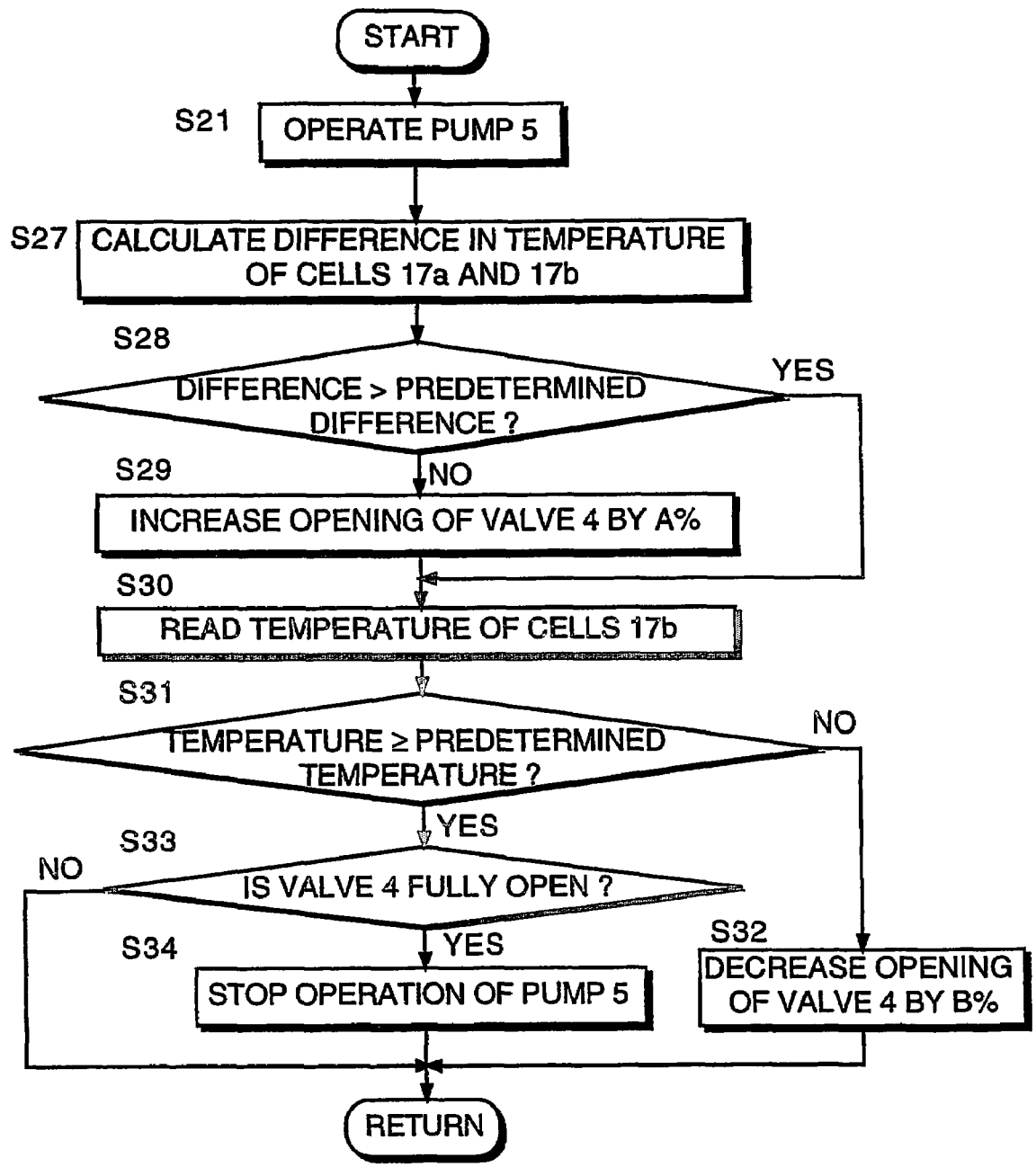
FIG. 9 is a flow chart describing a subroutine performed by the controller according to the third embodiment of this invention in the routine of FIG. 8.

In a following step S47, the controller 7 performs the warm-up subroutine for normal operation shown in FIG. 9. The step S21 of the subroutine performed here and the details of the processing of the steps S21 and S27-S34 are identical to the steps S21 and S27-S34 of the warm-up subroutine shown in FIG. 6.

The difference between this subroutine and the subroutine of FIG. 6 is that, in this subroutine, the steps S22-S26 which control the discharge flow rate of the pump 5 are omitted, and that, if the determination result of the step S31 is negative or after performing the processing of the step S32, the subroutine is terminated. This is because, in the former case, during operation of the fuel cell stack 1, the temperature does not fall as much as during low temperature starting of the fuel cell stack 1. The latter case is a measure to perform the routine of FIG. 8 at a fixed time interval.

When warm-up of the fuel cell stack 1 is required during power generation of the fuel cell stack 1, the subroutine of FIG. 9 is also performed repeatedly each time the routine of FIG. 8 is executed. As a result, the controller 7 raises the temperature of the unit cells 17b while suppressing increase in the temperature difference between the unit cells 17a and 17b by the operation of the pump 5, and increasing the opening of the drain valve 4 little by little.

Finally, the drain valve 4 is fully opened while the temperature difference between the unit cells 17a and 17b of the fuel cell stack 1 is maintained within the predetermined difference, and the temperature of the unit cells 17b has reached the predetermined temperature.

Referring again to FIG. 8, after the processing of the step S47, the controller 7 terminates the routine.

In the routine of FIG. 8, the controller 7 closes the drain valve 4 in the step S46 prior to executing the subroutine of FIG. 9. However, herein it is not necessary to fully close the drain valve 4. Only by reducing the opening of the drain valve 4 to a predetermined opening prior to the execution of the subroutine of FIG. 9, warm-up of the fuel cell stack 1 is still possible. Rather, a temperature rise can be expected while maintaining the cooling performance of the fuel cell stack 1 by not fully closing the drain valve 4.

On the other hand, when the vehicle speed is not larger than the predetermined vehicle speed in the step S44, the controller 7 determines whether or not the variation of vehicle speed is within a predetermined range in a step S49. The variation of vehicle speed is the difference between the vehicle speed detected on the immediately preceding occasion and the vehicle speed detected on the present occasion when the routine was performed.

When the variation of vehicle speed lies outside the predetermined range in the step S49, the controller 7, in a step S52, resets a counter value showing the duration of a low vehicle speed state, to zero. After the processing of the step S52, the controller 7 terminates the routine.

When the variation of vehicle speed is within the predetermined range in the step S49, the controller 7, in a step S50, increases the counter value by a fixed amount.

In a following step S51, the controller 7 compares the counter value with a predetermined value. Herein, the predetermined value is set to five minutes.

When the counter value does not exceed the predetermined value, the controller 7 terminates the routine without performing any further operations.

When the counter value exceeds the predetermined value, the controller 7 performs warm-up according to the aforesaid steps S46 and S47.

According to the steps S49-S52, warm-up operation is performed only when the vehicle speed is within predetermined limits and the low vehicle speed state continues for five minutes or more. This state is equivalent to the state of the vehicle in congested traffic, for example. Thus, in such a continuing low vehicle speed state, it is determined that there is a low possibility that the required power generation demand of the fuel cell stack 1 will increase rapidly, and that cooling of the fuel cell stack 1 will be suddenly required. Therefore, at low vehicle speed, warm-up operation is limited to such conditions.

According to this embodiment, as the pump 5 was provided in the bypass passage 14b, circulation of the coolant from the center of the fuel stack 1 to the ends of the fuel stack 1 where temperature rise is relatively late is promoted, and the temperature difference in the fuel cell stack 1 can be promptly eliminated. Also, by partially closing the drain valve 4, the fuel cell stack 1 can be warmed up while cooling other auxiliary devices using the coolant recirculation device 100.

This embodiment controls the opening of the drain valve 4 and discharge flow rate of the pump 5 according to the operating conditions of the fuel cell stack 1, so there is a rapid change-over between warm-up and cooling of the fuel cell stack 1 whenever the conditions change, and the temperature of the fuel cell stack 1 can be optimized with good response to condition change regardless of whether the fuel cell stack 1 is starting, operating or stopping.

In the steps S44, S45 and step S49, it is determined whether or not to perform warm-up operation based on vehicle speed. This determination can also be made based on the power generation demand of the fuel cell stack 1 instead of vehicle speed. In this case, when the power generation demand is more than a predetermined amount and is decreasing, or when the power generation demand is less than the predetermined amount, the controller 7 performs warm-up operation.

The power generation demand can be calculated from the depression amount of an accelerator pedal with which the vehicle is provided, and the vehicle speed. The heat generation amount of the fuel cell stack 1 depends on the power generation demand. Therefore, the cooling capacity and warm-up performance required by the fuel cell stack 1 also depend on the power generation demand. By determining whether or not to perform warm-up operation according to the power generation demand, the cooling capacity and warm-up performance can be made to directly correspond with the power generation demand.

In this embodiment, it is also possible to control temperature equalization inside the fuel cell stack 1 and warm-up of the fuel cell stack 1 based on traffic information from outside the vehicle. When the power generation demand of the fuel cell stack 1 can be estimated from traffic information, the cooling and warm-up control response of the fuel cell stack 1 can be enhanced.

If the power generation demand of the fuel cell stack 1 is small, it is also preferred to stop the coolant recirculation device 100 and to circulate coolant only inside the fuel cell stack 1 by the pump 5. By this measure, the energy consumed by the coolant recirculation device 100 can be reduced.

In this embodiment, the temperature sensor 21a was provided in the unit cell 17a which is in contact with the current collector 2, but it is preferably provided in the unit cell 17a which has been found to most easily reach low temperature experimentally.

Figure 10:
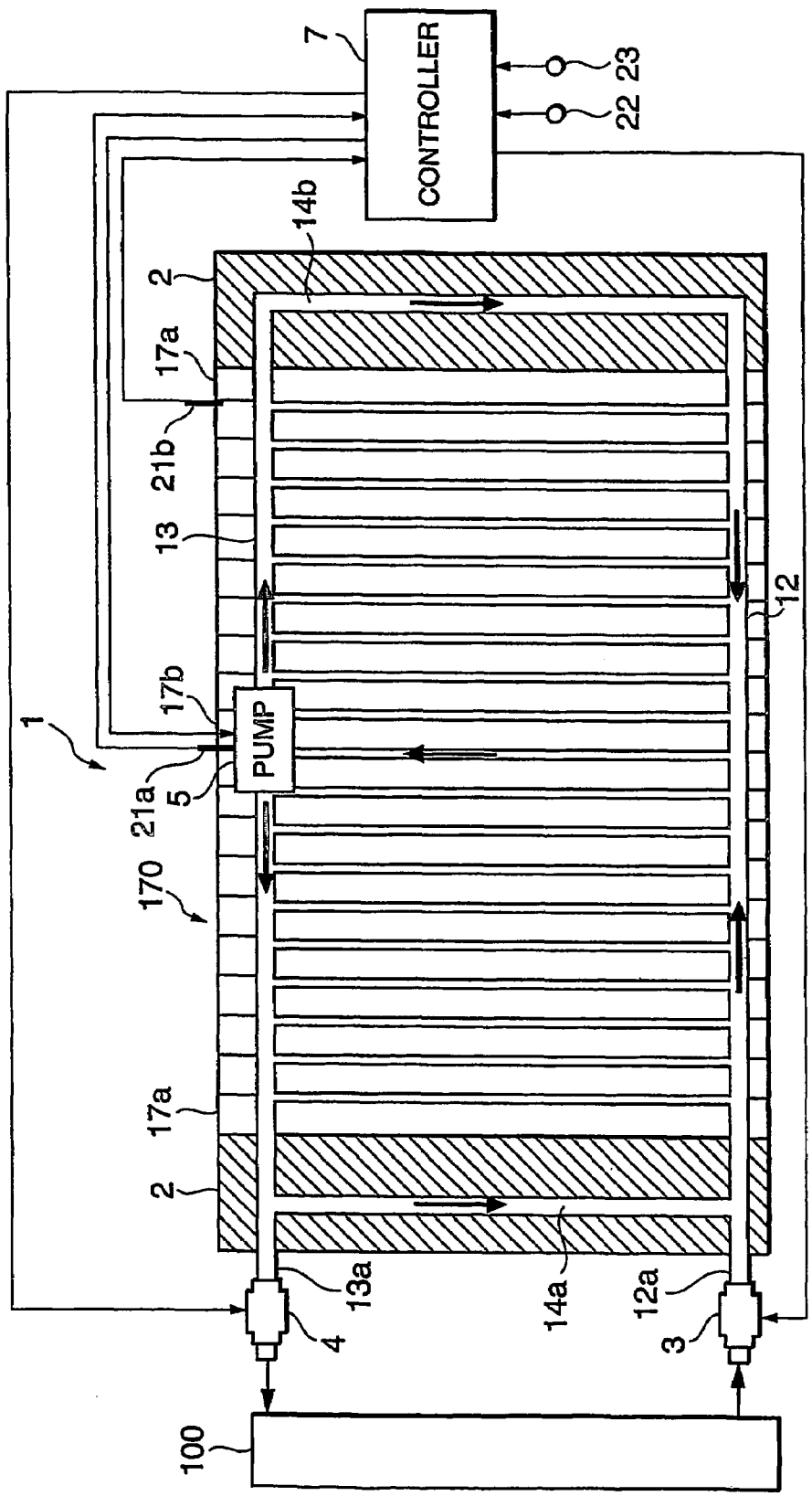
FIG. 10 is a schematic diagram including a longitudinal sectional view of a fuel cell stack according to a fourth embodiment of this invention.

Next, referring to FIG. 10, a fourth embodiment of this invention will be described.

The fuel cell stack 1 according to this embodiment is equivalent to providing the pump 5 in the center of the coolant discharge manifold 13 of the fuel cell stack 1 of the first embodiment. The remaining construction of the fuel cell stack 1 is identical to that of the fuel cell stack 1 of the first embodiment.

The pump 5 aspirates the coolant of the coolant passage 11b of the unit cells 17b in the center, discharges it to the coolant discharge manifold 13, and promotes circulation of coolant in the fuel cell stack 1. At this time, when the pump 5 discharges the coolant in both directions towards the ends of the coolant discharge manifold 13, the coolant circulates with bilateral symmetry as shown in FIG. 10. This circulation type is preferred for raising the temperature of the ends of the fuel cell stack 1 uniformly.

In this embodiment, the opening of the drain valve 4 and operation of the pump 5 are controlled by the controller 7 according to the third embodiment. The controller 7 also controls the opening of the supply valve 3. However, the control of the opening of the supply valve 3 is identical to the control of the opening of the drain valve 4. It is also possible to omit the supply valve 3 or drain valve 4.

Also in this embodiment, the fuel cell stack 1 demonstrates a desirable warm-up performance as in the third embodiment.

Next, referring to FIG. 11, FIGS. 12A and 12B, a fifth embodiment of this invention will be described.

Figure 11:
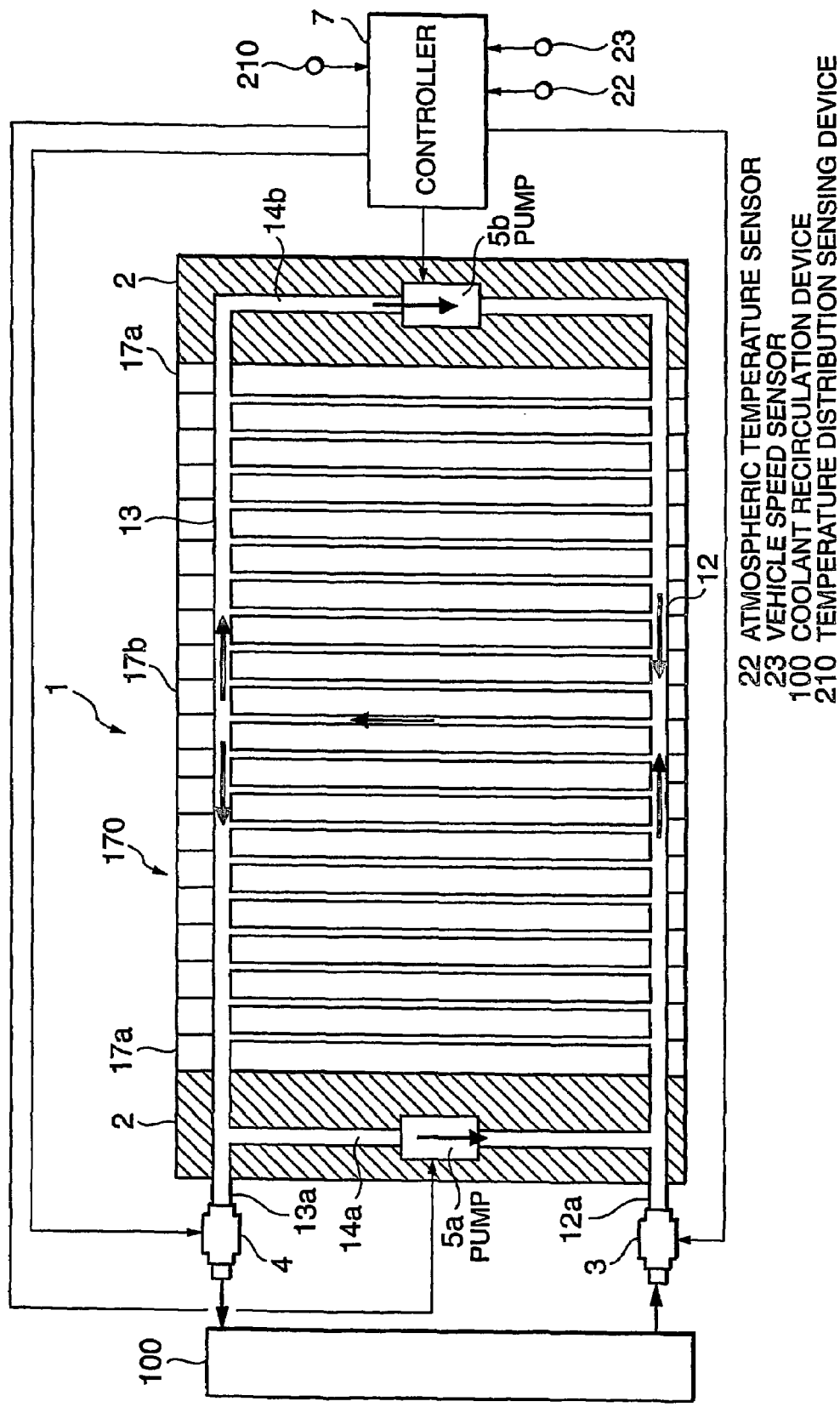
FIG. 11 is a schematic diagram including a longitudinal sectional view of a fuel cell stack according to a fifth embodiment of this invention.

Referring to FIG. 11, the fuel cell stack 1 according to this embodiment is equivalent to providing a first pump 5a in the bypass passage 14a and a second pump 5b in the bypass passage 14b of the fuel cell stack 1 of the first embodiment, respectively. The position of the first pump 5a of the bypass passage 14a, and the position of the second pump 5b of the bypass passage 14b, are preferably such as to give the smallest pressure loss. A reversible rotation pump is used for the second pump 5b.

Plural unit cells 17b are sequentially arranged in the center of the fuel cell stack 1, and the unit cells 17a are arranged on both sides of the unit cells 17b. A temperature distribution sensing device 210 which detects the temperature distribution in the fuel cell stack 1, is provided. The temperature distribution sensing device 210 comprises plural temperature sensors including the temperature sensors 21a and 21b, and detects the temperatures of the unit cells 17 at various positions in the fuel cell stack 1.

The remaining construction of the fuel cell stack 1 is identical to that of the fuel cell stack 1 of the first embodiment.

In this embodiment, the opening of the drain valve 4, the opening of the supply valve 3, and the operation of the first pump 5a and second pump 5b are controlled by the controller 7, respectively, and the first pump 5a and second pump 5b are rotated by electric motors, respectively. The controller 7 controls the supply current to these electric motors, and controls the operation of the first pump 5a and second pump 5b.

When the fuel cell stack 1 starts at low temperature, the controller 7 closes the supply valve 3 and drain valve 4, and operates the first pump 5a and second pump 5b. As a result, the coolant which circulates inside the fuel cell stack 1 transmits the heat of the unit cells 17b in the center which have an early rise in temperature, to the unit cells 17a at the ends which have a late rise in temperature, and by equalizing the temperature distribution in the fuel cell stack 1, the required warm-up time is shortened.

For this purpose, as in the third embodiment, the controller 7 performs the temperature control routine of FIG. 5 during shut-down of the fuel cell stack 1, performs the temperature control routine of FIG. 6 during startup of the fuel cell stack 1, and performs the temperature control routine of FIG. 8 during operation of the fuel cell stack 1.

In the execution of these routines, the opening of the supply valve 3 is controlled together with the opening of the drain valve 4. The operation of first pump 5a and second pump 5b are also controlled together. In other words, in the execution of these routines, the opening control signal of the drain valve 4 outputted in the third embodiment is outputted in this embodiment to both the drain valve 4 and the supply valve 3, and the control signal of the pump 5 outputted in the third embodiment is outputted to both the first pump 5a and second pump 5b.

Due to these control signals, the first pump 5a and second pump 5b rotate in the forward direction, respectively. The forward rotation direction corresponds to the direction in which the bypass passage 14a and bypass passage 14b discharge coolant downwards in FIG. 11.

The difference between the temperature control of the fuel cell stack 1 in this embodiment and the third embodiment is in the warm-up subroutine applied in the step S14 of FIG. 6, and the warm-up subroutine applied in the step S47 of FIG. 8.

Figure 12A:
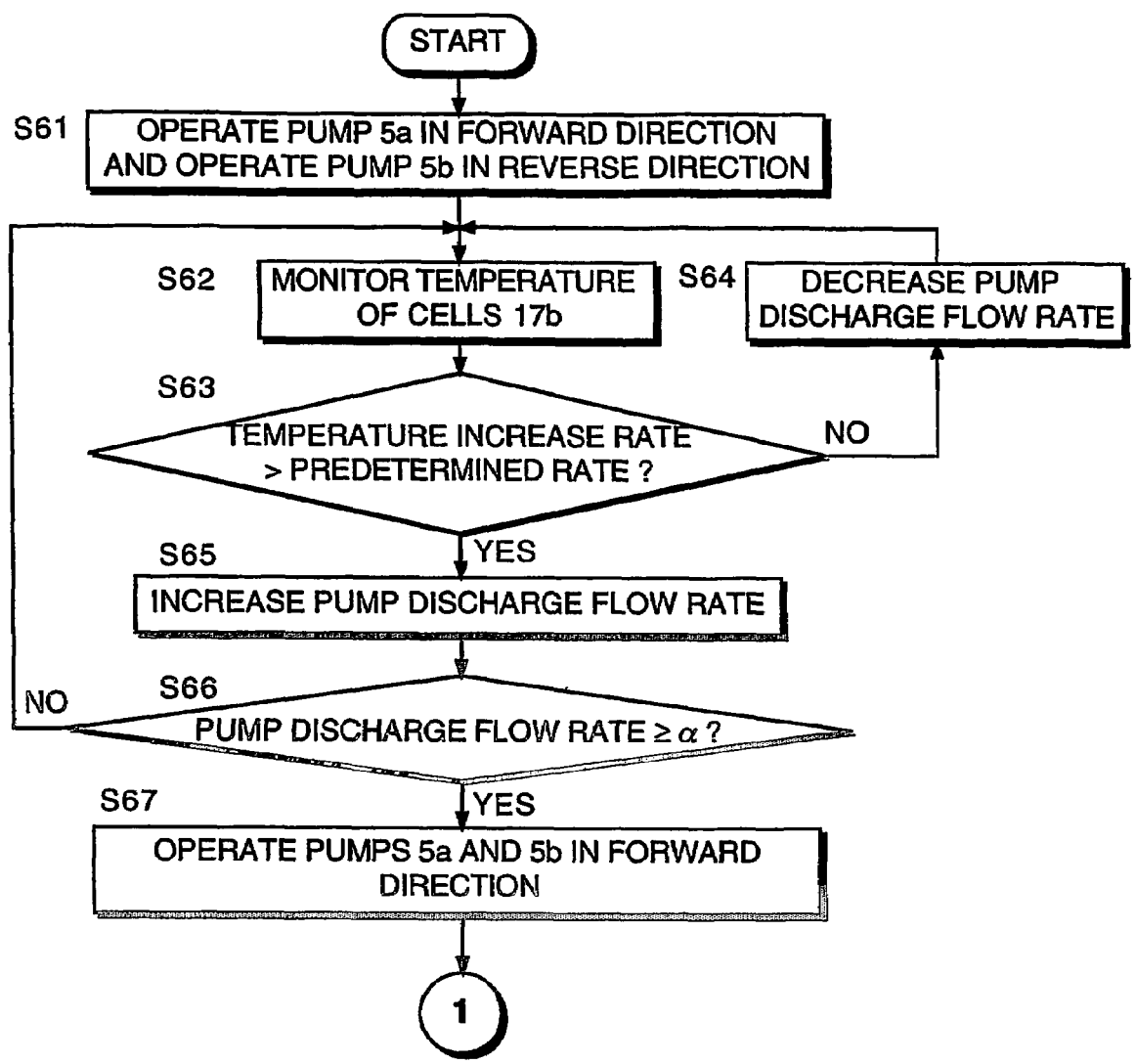
FIGS. 12A and 12B, are flow charts describing a subroutine performed by a controller according to the fifth embodiment of this invention, when it executes the routine of FIG. 6.
Figure 12B:
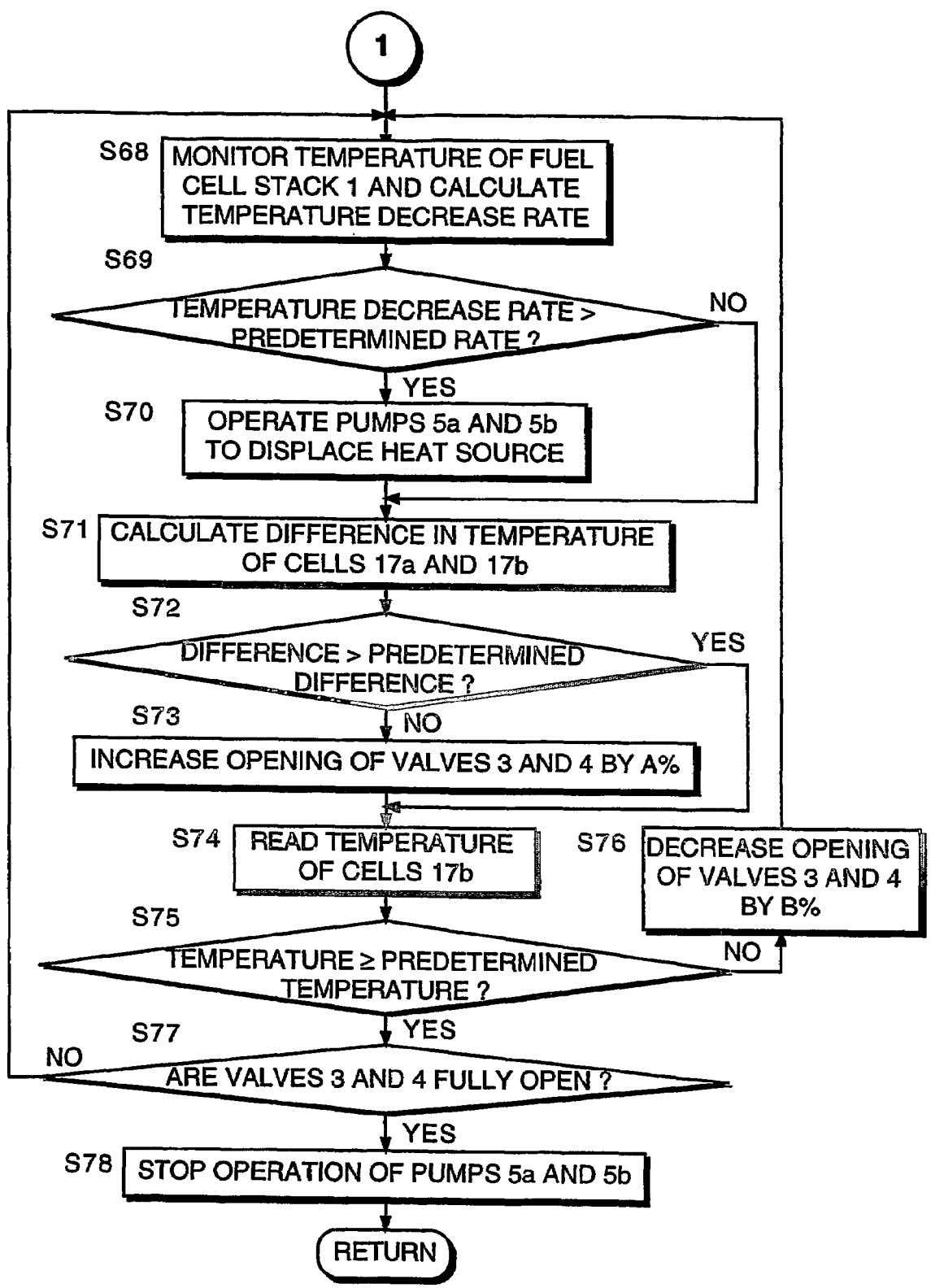

Referring to FIGS. 12A and 12B, the warm-up subroutine which this embodiment applies in the step S14 of FIG. 6 will now be described. In this subroutine, the controller 7 outputs a control signal to the first pump 5a and second pump 5b separately.

First, in a step S61, the controller 7 performs forward rotation of the first pump 5a, and performs reverse rotation of the second pump 5b. The coolant from the coolant discharge manifold 13 is recirculated to the coolant discharge manifold 13 via the bypass passage 14a, coolant supply manifold 12 and bypass passage 14b.

Figure 7:
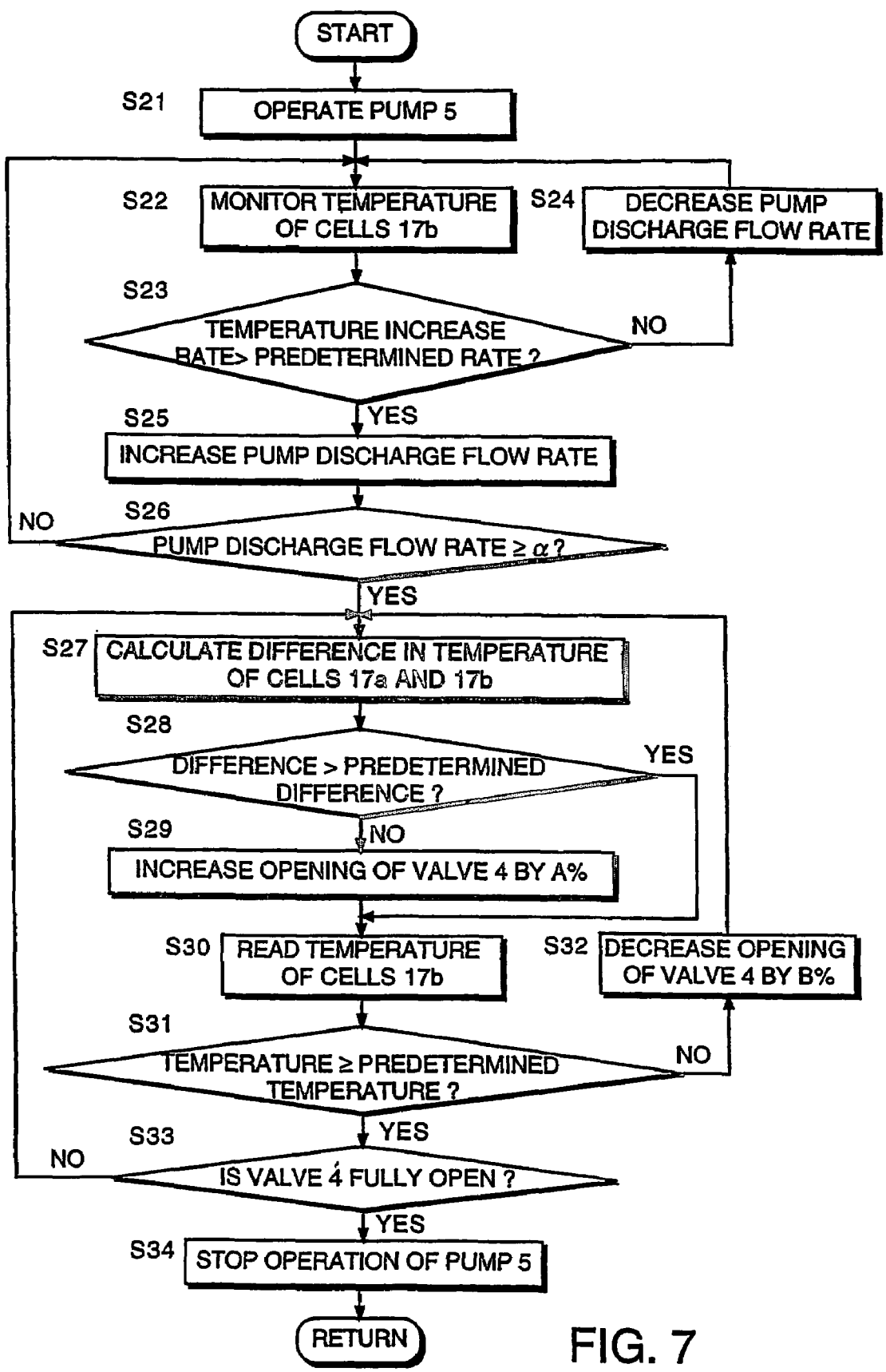
FIG. 7 is a flow chart describing a subroutine performed by the controller according to the third embodiment of this invention in the routine of FIG. 6.

The processing of the steps S62-S66 is identical to the processing of the steps S22-S26 of FIG. 7. Here, the first pump 5a which performs forward rotation and the second pump 5b which performs reverse rotation are operated under the same load.

In the steps S62-S66, as in the steps S22-S26, the controller 7 increases the discharge flow rate of the pumps 5a, 5b to the predetermined flow rate α little by little, while keeping the temperature rise of the unit cells 17b in the center of the fuel cell stack 1 from being less than the predetermined rate with the drain valve 4 closed.

When the discharge flow rate of the pumps 5a, 5b reaches the predetermined flow rate α, in a step S67, the controller 7 changes the rotation direction of the second pump 5b from reverse to forward rotation.

As a result, as shown in FIG. 11, the coolant discharged by the pumps 5a, 5b strikes the center of the coolant supply manifold 12. The coolant passages 11b of the unit cells 17b in the center have larger cross-sections than those of the coolant passages 11a of the unit cells 17a at the ends.

As the unit cells 17b in the center have a higher temperature than the unit cells 17a at the ends, the coolant in the coolant passages 11b has a lower viscosity than the coolant of the cooling passages 11a. Therefore, coolant which strikes the center of the coolant supply manifold 12 flows into the coolant discharge manifold 13 mainly through the coolant passages 11b. The coolant which flowed into the coolant discharge manifold 13 is divided into left and right flows according to the suction force of the first pump 5a and second pump 5b, and flows toward the bypass passages 14a and 14b.

Therefore, as shown in the figure, a flow of coolant which circulates between the coolant passages 11b and first pump 5a, and a flow of coolant which circulates between the coolant passages 11b and second pump 5b, are formed. Due to this flow, the heat of the unit cells 17b in the center with a relatively higher temperature is transmitted to the unit cells 17a at the ends by the recirculating coolant.

In a following step S68, the controller 7 monitors the temperature of the unit cells 17b which is the heat source of this heat transmission cycle, and detects the temperature decrease rate due to circulation of coolant.

In a following step S69, the controller 7 determines whether or not the temperature decrease rate of the unit cells 17b exceeds a predetermined rate. When the temperature decrease rate of the unit cells 17b exceeds the predetermined rate, the controller 7, in a step S70, changes the state of the first pump 5a and second pump 5b from a state wherein they have the same load, to a state wherein there is a predetermined load bias. In other words, the current is controlled so that a predetermined difference arises in the current amount supplied to the electric motor which drives the first pump 5a, and to the electric motor which drives the second pump 5b.

As a result, a difference arises in the discharge flow rate of the first pump 5a and second pump 5b, and the strike point of coolant discharged into the coolant supply manifold 12 shifts from the unit cells 17b in the center towards left or right.

If heat transfer from specific unit cells 17b to the unit cells 17a at the end of the fuel cell stack 1 continues, the temperature of the specific unit cells 17b will fall. In that case, the loads of the first pump 5a and second pump 5b are changed so that heat transfer from other unit cells 17b to the unit cells 17a at the end may be performed.

In the step S69, the determination of whether or not a heat source shift should be performed is based on a time sequence variation of the temperature of the unit cells 17b which are currently supplying heat, but this determination may also be performed based on the temperature distribution in the fuel cell stack 1 detected by the temperature distribution sensing device 210. Specifically, the temperature difference between the heat source and the ends is calculated from the detection result of the temperature distribution sensing device 210, and the heat amount which moved from the heat source to the ends is calculated from the time sequence variation of the temperature difference. If this heat amount exceeds a predetermined heat amount, the heat source is shifted.

After the processing of the step S70, the controller 7 performs the processing of a step S71. If the temperature decrease rate of the heat source unit cells 17b does not exceed the predetermined rate in the step S69, the controller 7 skips the step S70 and performs the processing of the step S71.

The processing of the steps S71-S78 is fundamentally the same as the processing of the steps S27-S34 of FIG. 7. However, the detection of the temperature difference in the step S71 is performed by the temperature distribution sensing device 210. Instead of detecting the difference between the temperature of the specific unit cell 17b in the center, and the unit cells 17a at the ends, the determination of a step S72 may also be performed by comparing the difference between a highest temperature and lowest temperature detected by the temperature distribution sensing device 210 with a predetermined difference.

In steps S73 and S76, the opening of the supply valve 3 is also increased or decreased together with the drain valve 4. In a step S77, the supply valve 3 is fully opened together with the drain valve 4.

According to this embodiment, warm-up of the unit fuel cells 17a at the ends of the fuel cell stack 1 which have a late temperature rise, can be promoted by the heat generated by operation of the two pumps 5a, 5b formed in the current collectors 2. Also, by performing forward rotation of the pumps 5a, 5b, as two circulating flows which flow from the center to both ends are formed in the fuel cell stack 1, warm-up of unit fuel cell 17a is further promoted, so warm-up time is shortened by equalizing the temperature in the fuel cell stack 1.

On the other hand, by reversing the second pump 5b, one circulating flow in the fuel cell stack 1 is formed, and even when the viscosity of the coolant is high, the coolant can be circulated in the fuel cell stack 1 while suppressing load increase of the pumps 5a and 5b.

Moreover, as the low temperature part can always be warmed up using a hot heat source by shifting the heat source according to the temperature conditions in the fuel cell stack 1, warm-up efficiency improves.

In the subroutines of FIGS. 12A and 12B, after performing a heat source shift in the steps S69 and S70, the openings of the drain valve 4 and the supply valve 3 are increased or decreased in the steps S71-S73 and step S76. In other words, heat source shift and valve opening adjustment are performed sequentially.

Figure 13:
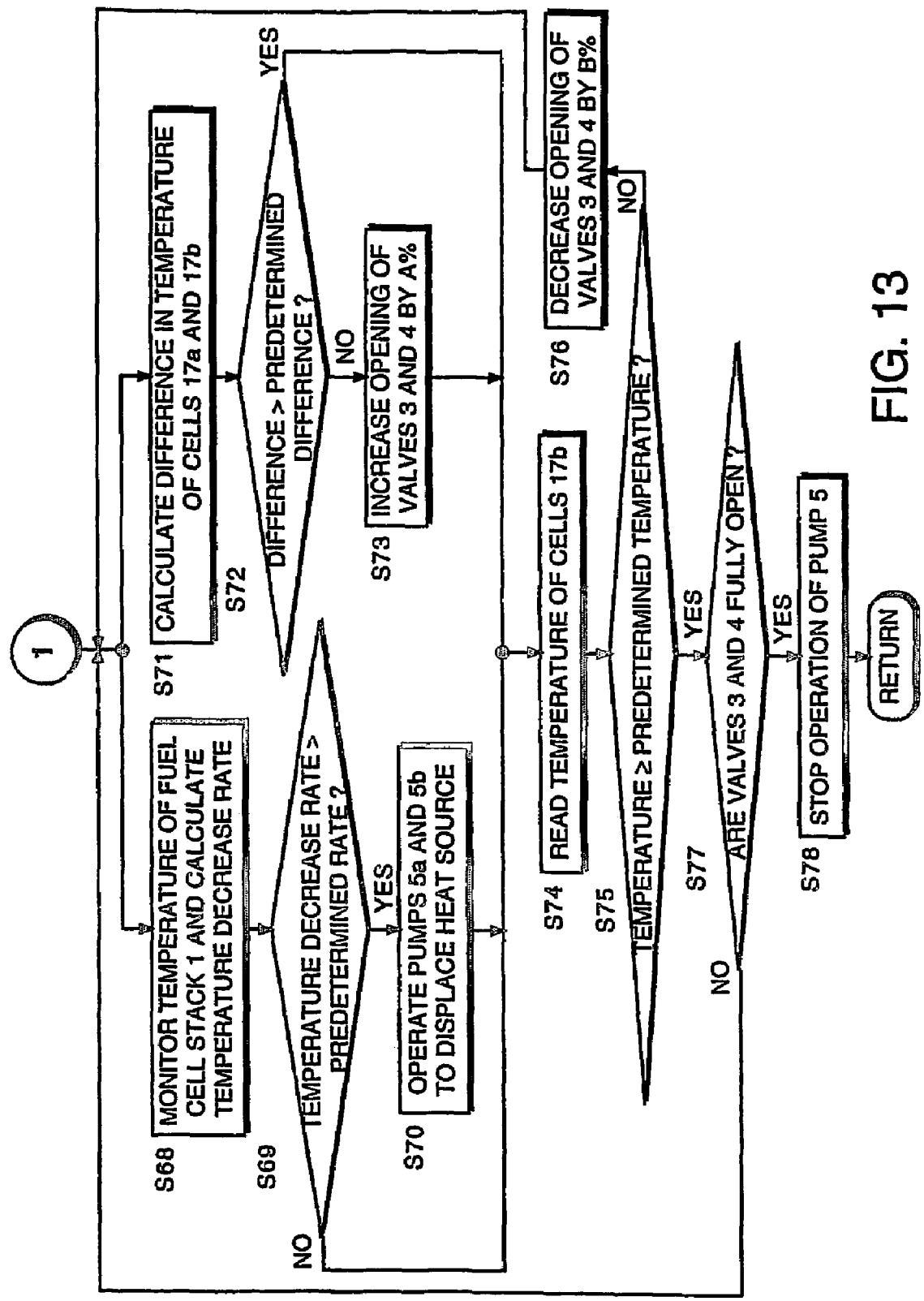
FIG. 13 is a flow chart describing an alternative to the subroutine of FIGS. 12A and 12B.

When the controller 7 comprises plural separate microprocessors, it is also possible to perform these two operations in parallel as shown in FIG. 13. In other words, after performing forward rotation of the first pump 5a and reversing the second pump 5b in the step S67, the controller 7 performs the heat source shift processing of the steps S68-S70, and adjustment of the valve opening of the steps S71-S73, in parallel. Thus, by controlling in parallel, the warm-up time of the fuel cell stack 1 can be further shortened.

Next, referring to FIG. 14, the subroutine applied by the controller 7 during execution of the warm-up routine during operation shown in FIG. 8, will be described. The processing of the step S67 and of the steps S69-S78 of this subroutine is identical to that of the steps S67, S69-S78 of the subroutine of FIGS. 12A and 12B. The difference between this subroutine, and the subroutine of FIGS. 12A and 12B, is that the processing of the steps S61-S66 which performs warm-up by the forward rotation of the pump 5a and the reverse rotation of the pump 5b, is omitted, that a step S68A is provided instead of the step S68, and that after the processing of the step S76, or when the determination result of the step S77 is negative, the subroutine is terminated.

The reason why the steps S61-S66 are omitted is that, during operation of the fuel cell stack 1, the temperature does not fall so much as when the fuel cell stack 1 is started at low temperature.

In the step S68A, the controller 7 reads the temperature of the unit cells 17b, and calculates a temperature decrease rate from the temperature of the unit cells 17b read on the immediately preceding occasion the subroutine was executed, and the temperature of the unit cells 17b read on the present occasion.

Figure 14:
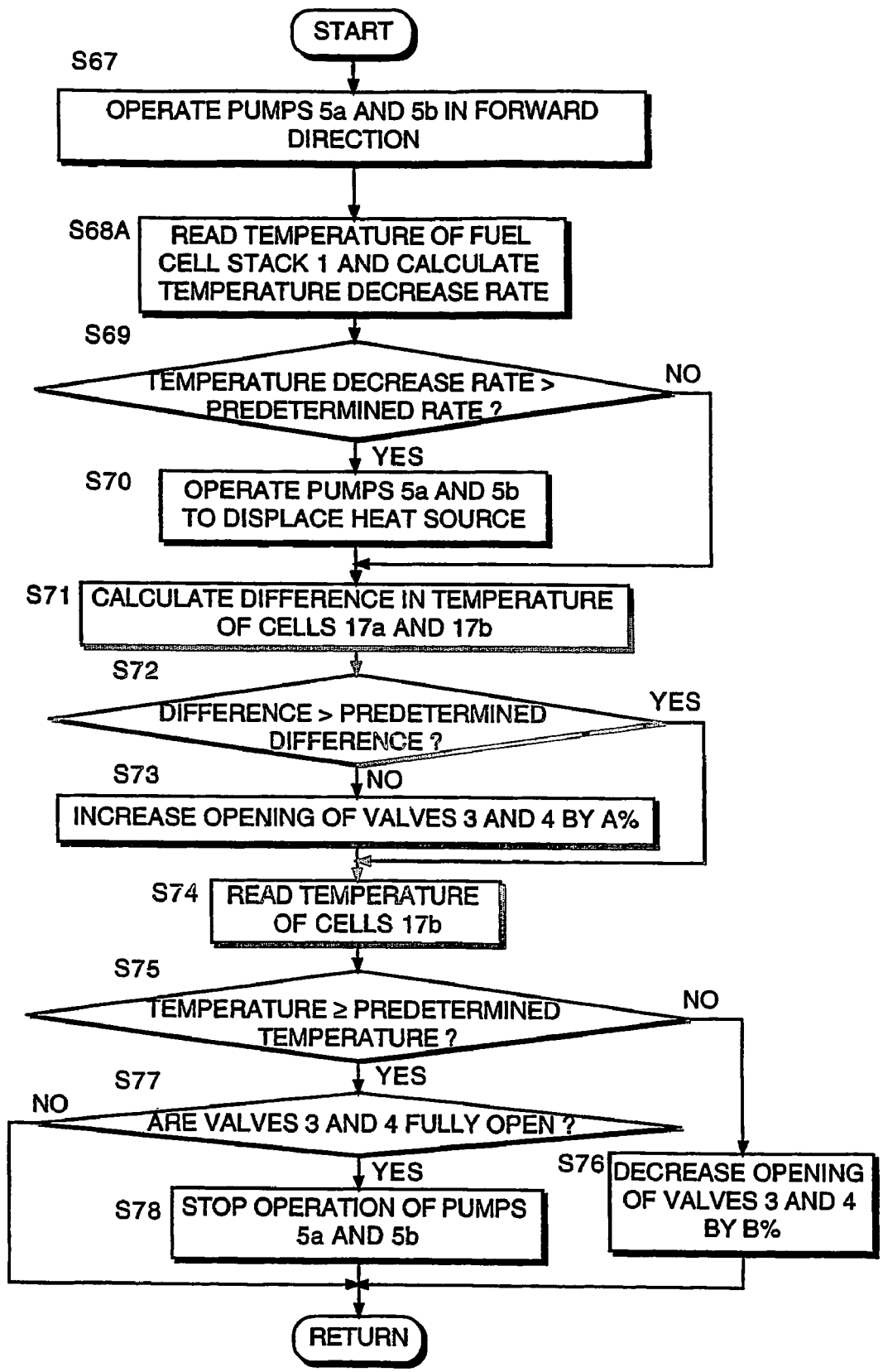
FIG. 14 is a flow chart describing a subroutine performed by the controller according to the fifth embodiment of this invention

In the step S68 of FIG. 12B, whereas the temperature decrease rate of the unit cells 17b is calculated by monitoring the temperature of the unit cells 17b for a fixed time period, in the step S68A of FIG. 14, it is calculated using the immediately preceding value. This is because, whereas the subroutine of FIGS. 12A and 12B is performed only once on startup, this subroutine, which is part of the temperature control routine during operation of FIG. 8, is performed repeatedly at a fixed interval. This is also why, after the processing of the step S76, or when the determination result of the step S77 is negative, the subroutine is terminated.

Figure 15:
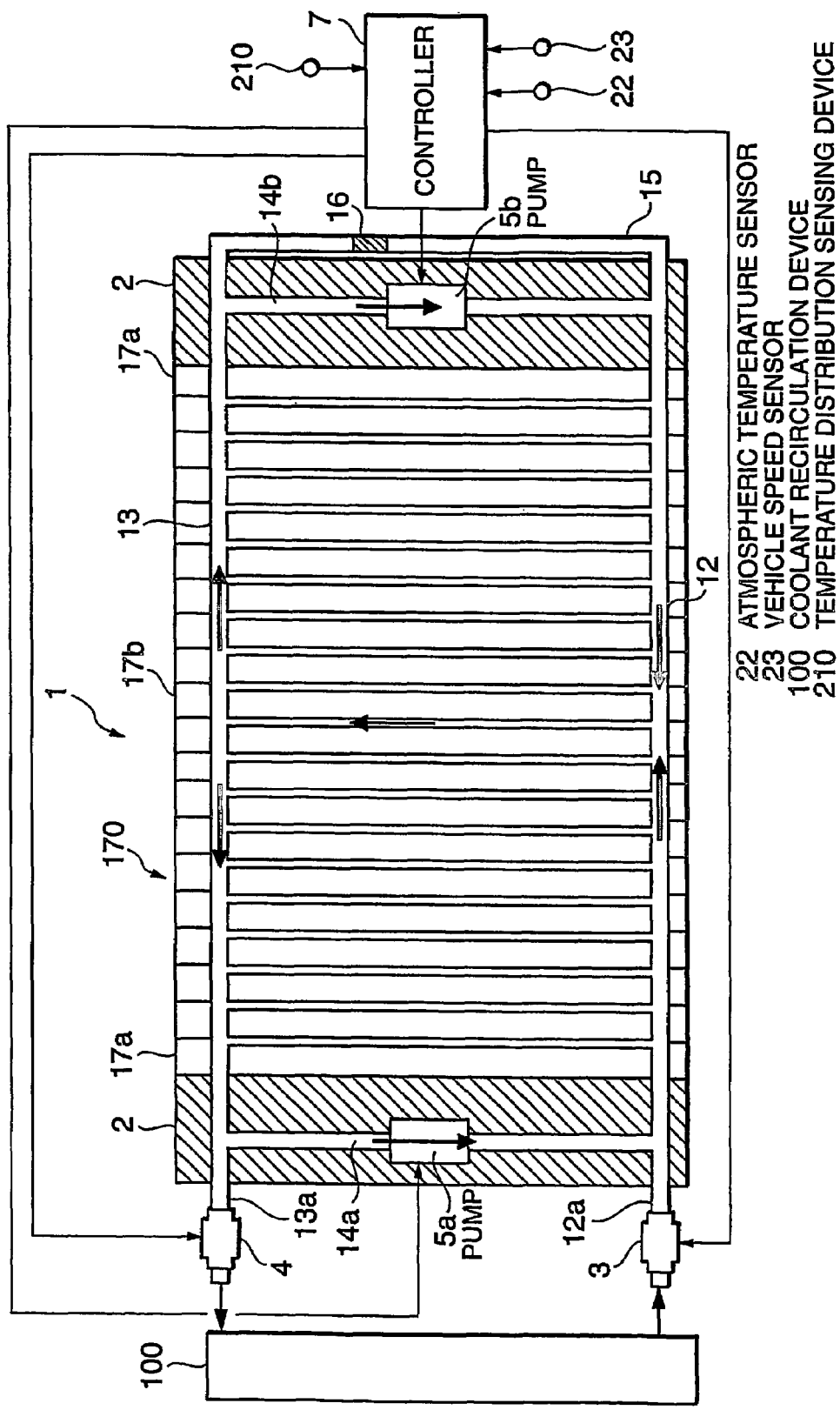
FIG. 15 is a schematic diagram including a longitudinal sectional view of a fuel cell stack according to a sixth embodiment of this invention.

Next, referring to FIG. 15, a sixth embodiment of this invention will be described.

In this embodiment, a bypass passage 15 is further formed outside the current collector 2 of the fuel cell stack 1 of the fifth embodiment. The bypass passage 15 bypasses the second pump 5b, and connects an end of the coolant supply manifold 12 with an end of the coolant discharge manifold 13.

A temperature response valve 16 is installed in the bypass passage 15 which opens and closes according to the temperature.

The valve body of the temperature response valve 16 is formed of a shape-memorizing alloy which memorizes the shape at high temperature, or of a material having a large thermal expansion coefficient. The temperature response valve 16 remains open while the temperature of the bypass passage 15 is low, and closes when the temperature of the bypass passage 15 rises to high temperature. In other words, if the fuel cell stack 1 starts at low temperature, it is open, but when warm-up of the fuel cell stack 1 is completed, it closes.

Under low temperature conditions, as the viscosity of the coolant is high, circulation resistance of the coolant passages 11a, 11b of the fuel cell stack 1 is large, and if the pumps 5a, 5b are rotated in the forward direction in the step S67 of FIG. 14, the coolant pressure of the coolant supply manifold 12 may become excessive, and as a result, excessive load may be applied to the pumps 5a, 5b. However, if the bypass passage 15 is provided as in this embodiment, the coolant pressure of the coolant supply manifold 12 does not become excessive at low temperature, so an excessive load is not applied to the pumps 5a, 5b.

Also, if coolant circulates in the bypass passage 15, the rotational resistance of the pumps 5a, 5b will decrease and the rotation speed of the pumps 5a, 5b will increase. As the increase of rotation speed increases the heat generation amount of the pumps 5a, 5b, the warm-up of the fuel cell stack 1 is further promoted.

On the other hand, during the normal operation of the fuel cell stack 1, the temperature response valve 16 is closed so the bypass passage 15 does not circulate coolant. As a result, during normal operation, the energy consumption amount spent on cooling the fuel cell stack 1 does not increase.

Figure 16A:
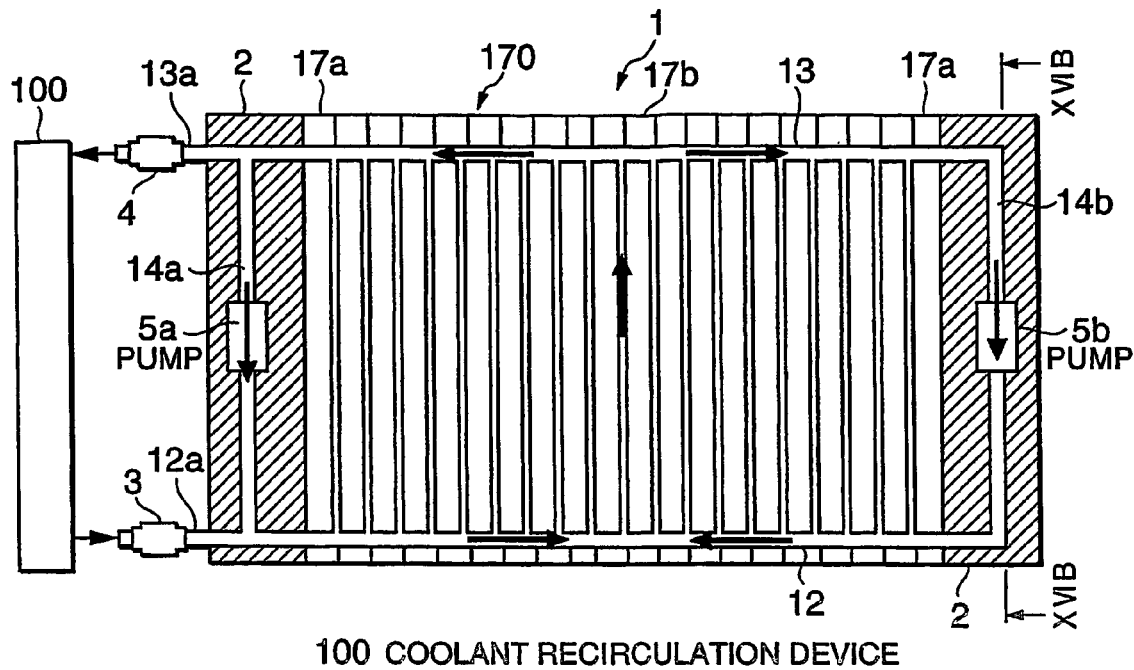
FIGS. 16A and 16B are a schematic longitudinal sectional view and a cross-sectional view of a fuel cell stack showing an alternative with respect to a bypass passage according to the sixth embodiment of this invention.
Figure 16B:
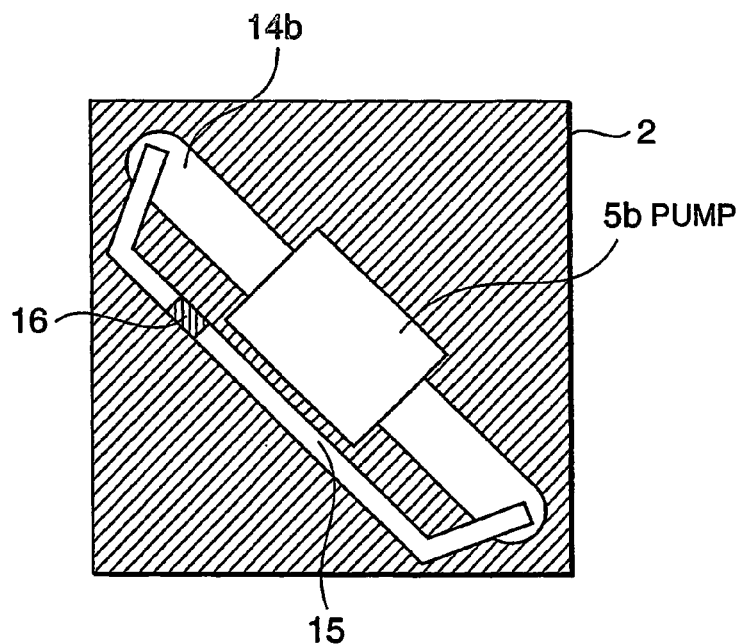

The bypass passage 15 can also be formed inside the current collector 2, as indicated in FIGS. 16A and 16B. Herein, the bypass passage 14b is arranged in the direction of a diagonal of a rectangular cross-section of the fuel cell stack 1. The bypass passage 15 is formed in parallel with the bypass passage 14b inside the current collector 2. By forming the bypass passage 15 in the current collector 2 in this way, dimensional increase in the lamination direction of the fuel cell stack 1 can be suppressed.

Next, referring to FIGS. 17-24, a seventh embodiment of this invention will be described.

Figure 17:
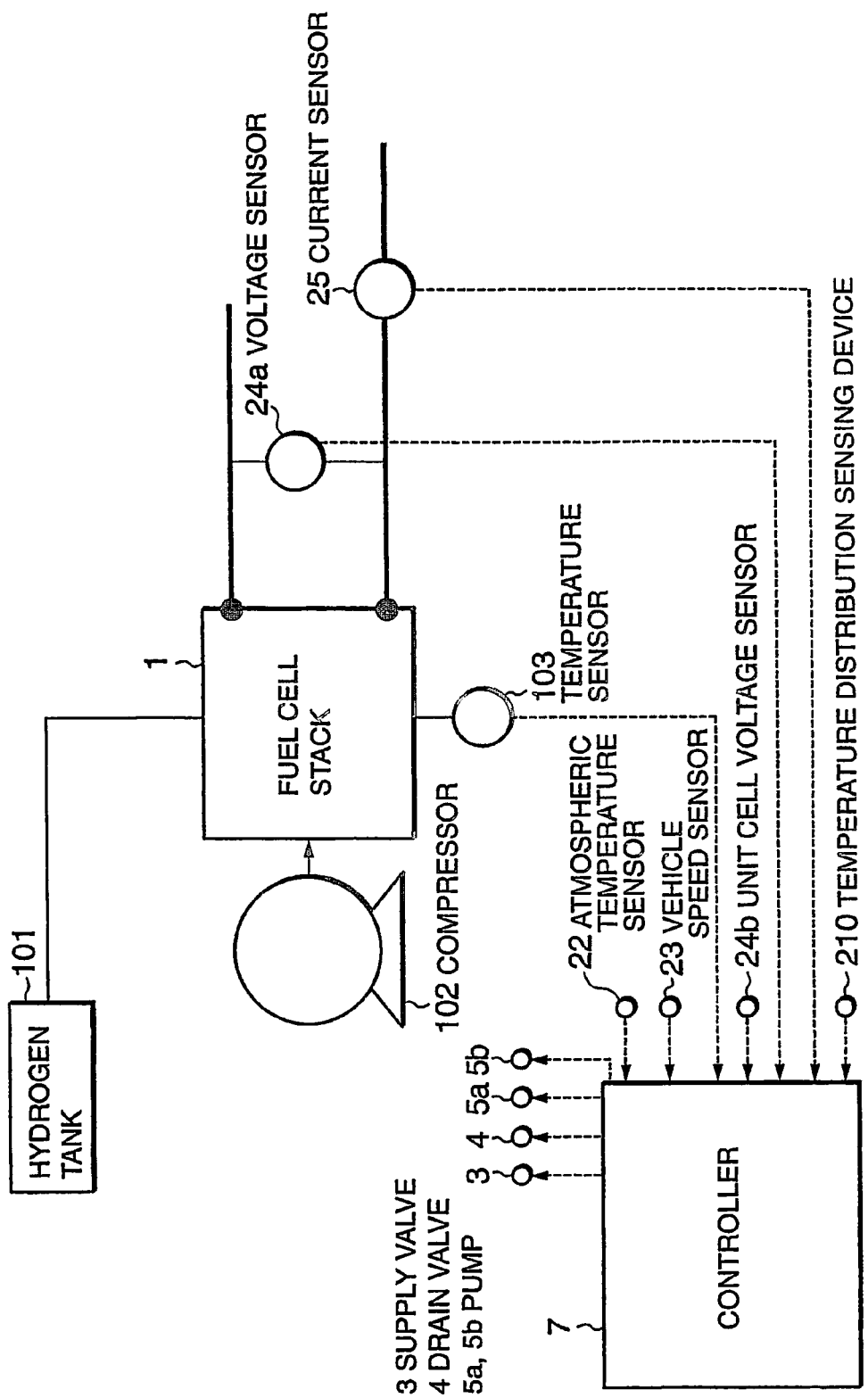
FIG. 17 is a schematic diagram of a fuel cell system according to a seventh embodiment of this invention.

Referring to FIG. 17, a fuel cell system according to this embodiment comprises a fuel cell stack 1, a hydrogen tank 101 that provides hydrogen to the fuel cell stack 1 as anode gas, a compressor 102 that provides air to the fuel cell stack 1 as cathode gas, a temperature censor 103 that detects a temperature Tfc of the fuel cell stack 1, a voltage sensor 24a that detects an output voltage Vfc of the fuel cell stack 1, unit cell voltage detecting device 24b, and a current sensor 25 that detects an output electric current Ifc of the fuel cell stack 1, as well as the temperature distribution sensing device 210, atmospheric temperature sensor 22, vehicle speed sensor 23, temperature distribution sensing device 210 and the controller 7.

The voltage detecting device 24b respectively detects output voltages of plural unit cells 17 including the unit cells 17b of the central part, and the unit cells 17a at the ends. It may comprise a sensor which detects the average voltage of plural unit cells whether the unit cells 17a, 17b whereof the voltages are detected are adjacent to each other, or in different positions.

The temperature sensors 21a, 21b of the third embodiment may be used instead of the temperature distribution sensing device 210.

The construction of the fuel cell stack 1 is similar to that of the fifth embodiment as shown in FIG. 18.

Also in this embodiment, as in the fifth embodiment, the temperature control routine of FIG. 5 is performed when the fuel cell stack 1 stops operating, the temperature control routine of FIG. 6 is performed when the fuel cell stack 1 starts operating, and the temperature control routine of FIG. 8 is performed during operation of the fuel cell stack 1.

In the temperature control of the fuel cell stack 1, the difference between this embodiment and the fifth embodiment is in the warm-up subroutine applied in the step S14 of FIG. 6, and the warm-up subroutine applied in the step S47 of FIG. 8.

Figure 19A:
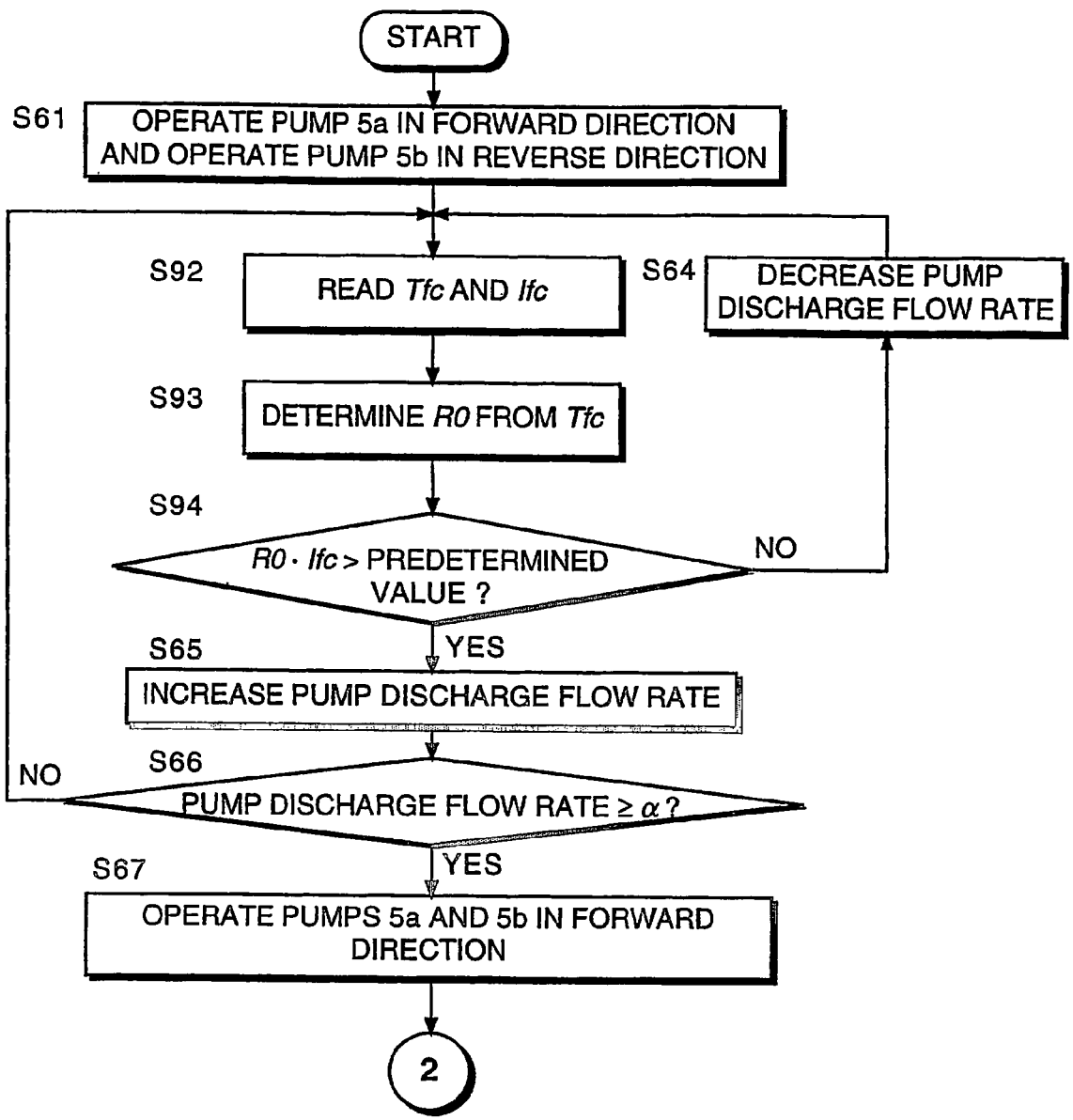
FIGS. 19A and 19B are flow charts describing a subroutine performed by a controller according to the seventh embodiment of this invention, when it executes the routine of FIG. 6.
Figure 19B:
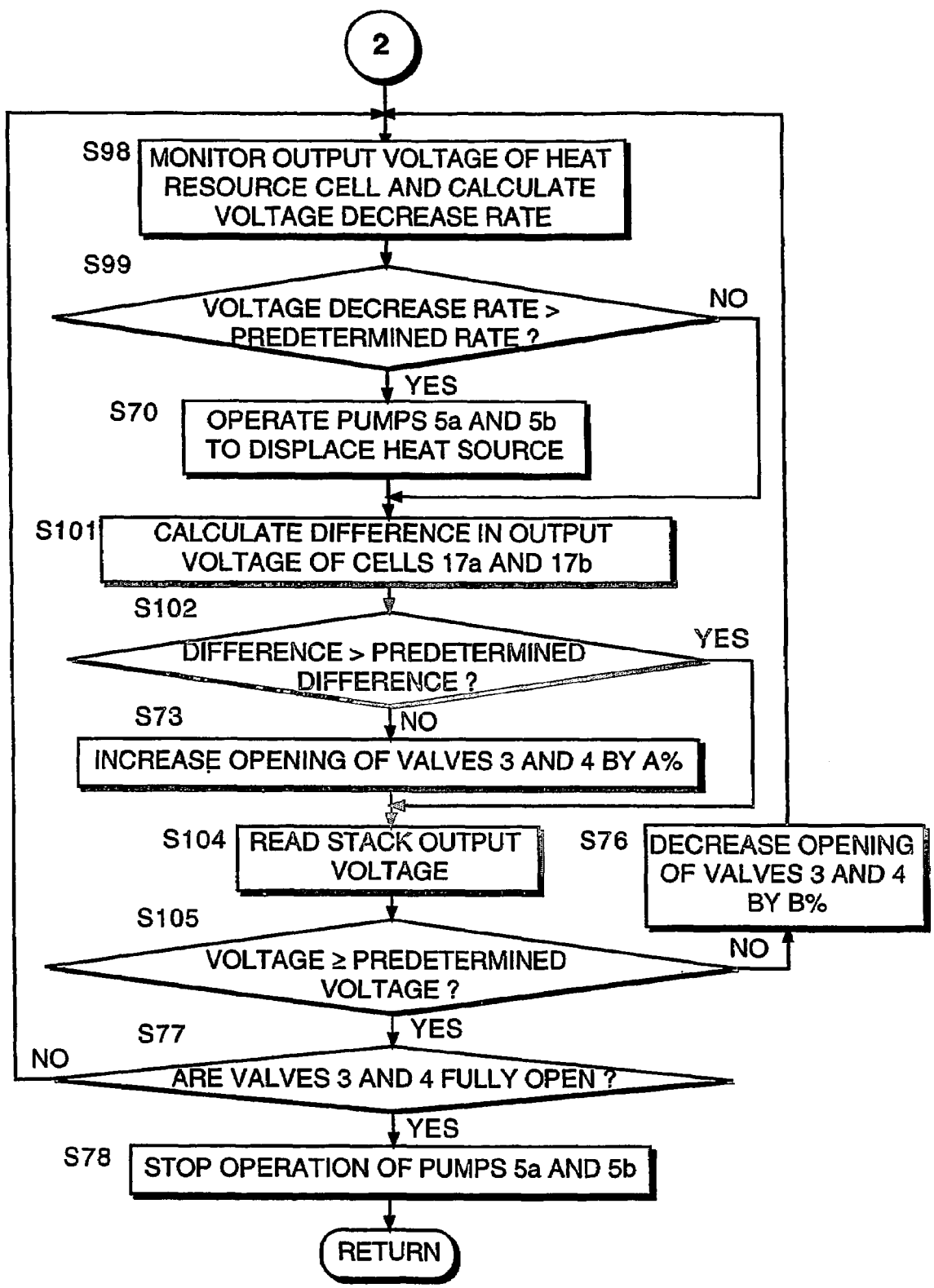

Referring to FIGS. 19A and 19B, the warm-up subroutine which the controller 7 according to this embodiment applies in the step S14 of FIG. 6, will be described.

The processing of the steps S61, S64-S67, S70 and S73 of this subroutine, and the steps S76-S78, is identical to the steps having the same numbers of the subroutine of FIGS. 12A and 12B. In this subroutine, steps S92-S94 are provided instead of the steps S62, S63, steps S98, S99 are provided instead of the steps S68, S69, steps S101, S102 are provided instead of the steps S71, S72, and steps S104, S105 are provided instead of the steps S74, S75, of the subroutine of FIGS. 12A and 12B.

In the step S92, the controller 7 reads the temperature Tfc detected by the temperature censor 103 and the output current Ifc detected by the current sensor 25.

Figure 20:
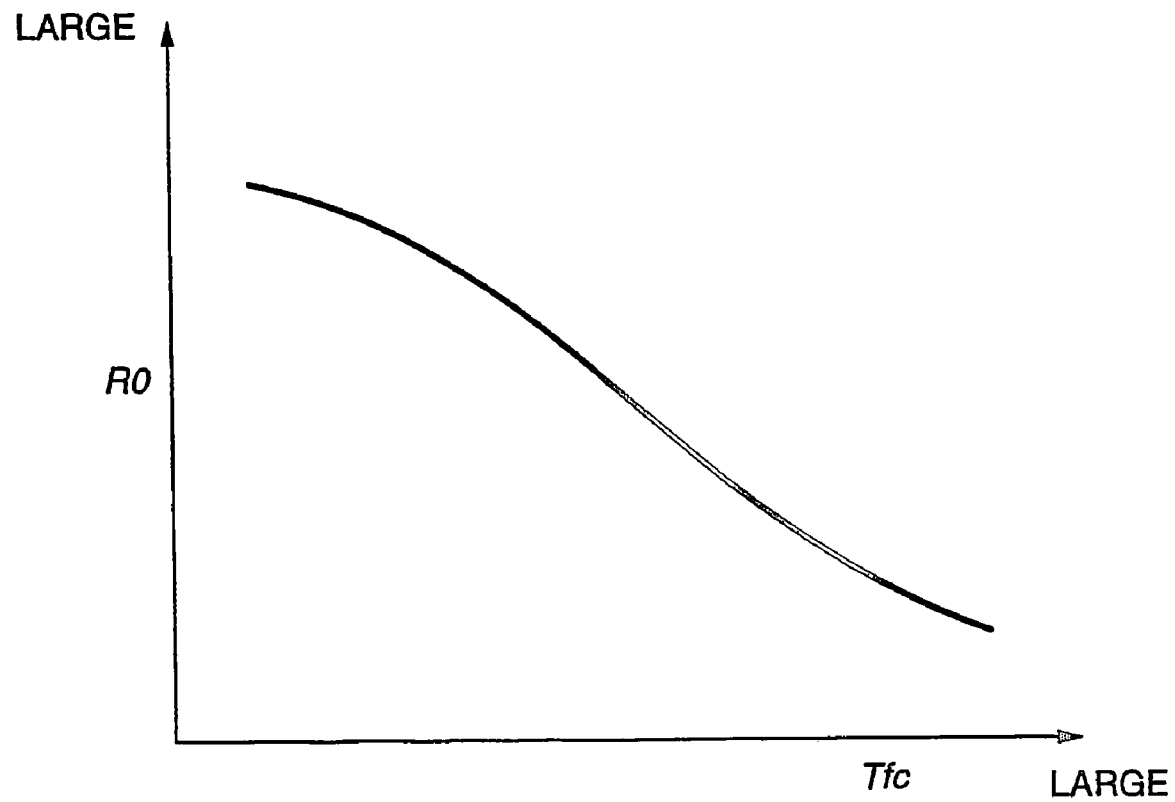
FIG. 20 is a diagram describing the relation of a temperature Tfc and an internal resistance R0 of the fuel cell stack, which can be used to estimate an amount of heat generated in the fuel cell stack by the controller according to the seventh embodiment of this invention.

In the next step S93, the controller 7 determines an internal resistance R0 of the fuel cell stack 1 by referring to a map having characteristics shown in FIG. 20 from the temperature Tfc of the fuel cell stack 1. According to this map, as the temperature Tfc increases, the internal resistance R0 decreases. This map is experimentally defined and previously stored in the memory (ROM) of the controller 7.

In the next step S94, the product of the internal resistance R0 and the output current Ifc is compared with a predetermined value.

According to this embodiment, it is assumed that the product of the internal resistance R0 and the output current Ifc, which is equal to the difference between a theoretical output voltage of the fuel cell stack 1 when the internal resistance R0 is zero and the actual output voltage Vfc, is used in the fuel cell stack 1 to generate heat. Hence, the larger the value of the product R0·Ifc, the larger the heat amount generated in the fuel cell stack 1.

In the step S94, when the product R0·Ifc is larger than the predetermined value, the controller 7 considers that the fuel cell stack 1 is generating sufficient amount of heat, and decreases the pump discharge flow rate in the step S64. When the product R0·Ifc is not larger than the predetermined value, the controller 7 considers that the heat amount generated in the fuel cell stack 1 is not sufficient, and increases the pump discharge flow rate in the step S65.

When the pump discharge flow rate reaches the predetermined flow rate a in the step S66, in the step S67, both the pumps 5a, 5b are rotated in the forward direction.

In the step S98, the output voltage of the unit cells 17b used as heat source is monitored over a fixed time period, and an output voltage decrease rate is calculated.

In the following step S99, the output voltage decrease rate of the heat source unit cells 17b is compared with the predetermined rate. When the output voltage decrease rate of the unit cell 17b is below the predetermined rate, the controller 7, in the step S70, shifts the heat source by changing the load of the first pump 5a and second pump 5b. After the processing of the step S70, the controller 7 performs the processing of the step S101. When the output voltage decrease rate of the heat source unit cells 17b is larger than the predetermined rate, the processing of the step S101 is performed without shifting the heat source.

In the step S101, the controller 7 calculates the output voltage difference between the unit cells 17b in the center, and the unit cells 17a at the ends.

In the following step S102, the output voltage difference is compared with a predetermined voltage difference. Herein, when the output voltage difference is below the predetermined voltage difference, it is determined that the temperature difference in the fuel cell stack 1 is not large, and in the step S73, the opening of the valves 3 and 4 is increased. After the processing of the step S73, the controller 7 performs the processing of the step S104. On the other hand, when the output voltage difference exceeds the predetermined voltage difference, the step S73 is skipped and the processing of the step S104 is performed.

In the step S104, the controller 7 reads the output voltage Vfc of the fuel cell stack 1 detected by the voltage sensor 24a.

In the following step S105, it is determined whether or not the output voltage Vfc of the fuel cell stack 1 is more than a predetermined voltage. When the output voltage of the fuel cell stack 1 is more than the predetermined voltage, it is determined in the step S77 whether or not the valves 3 and 4 are fully open. When the valves 3 and 4 are fully open, the controller 7, in the step S78, stops the operation of the pumps 5a, 5b and terminates the subroutine.

When the valves 3 and 4 are not yet full open, the controller 7 repeats the processing after the step S98. In the step S105, when the output voltage of the fuel cell stack 1 is smaller than the predetermined voltage, the controller 7, in the step S76, reduces the opening of the valves 3 and 4, and repeats the processing after the step S98.

The subroutine of FIGS. 19A and 19B performs identical processing to that of the subroutine of FIGS. 12A and 12B, but differs from the subroutine of FIGS. 12A and 12B in that the temperature rise of the fuel cell stack 1 or the temperature difference in the fuel cell stack 1 is determined by the internal resistance R0 and the output current Ifc, and the output voltages of the unit cells 17a and 17b.

Next, referring to FIG. 21, the warm-up subroutine applied in the step S47 of FIG. 8 will be described.

The relation between this subroutine, and the subroutine of FIGS. 19A and 19B, corresponds to the relation between the subroutine of FIG. 14 and the subroutine of FIGS. 12A and 12B of the fifth embodiment.

Specifically, the differences from the subroutine of FIGS. 19A, 19B are that the processing of the steps S61-S66 which perform warm-up by the forward rotation of the pump 5a and reverse rotation of the pump 5b is omitted, and part of the processing is modified due to the difference of the subroutine execution conditions.

The processing of each step of this subroutine was described referring to the subroutine of FIGS. 19A, 19B and the subroutine of FIG. 14, so its description is omitted here.

Figure 21:
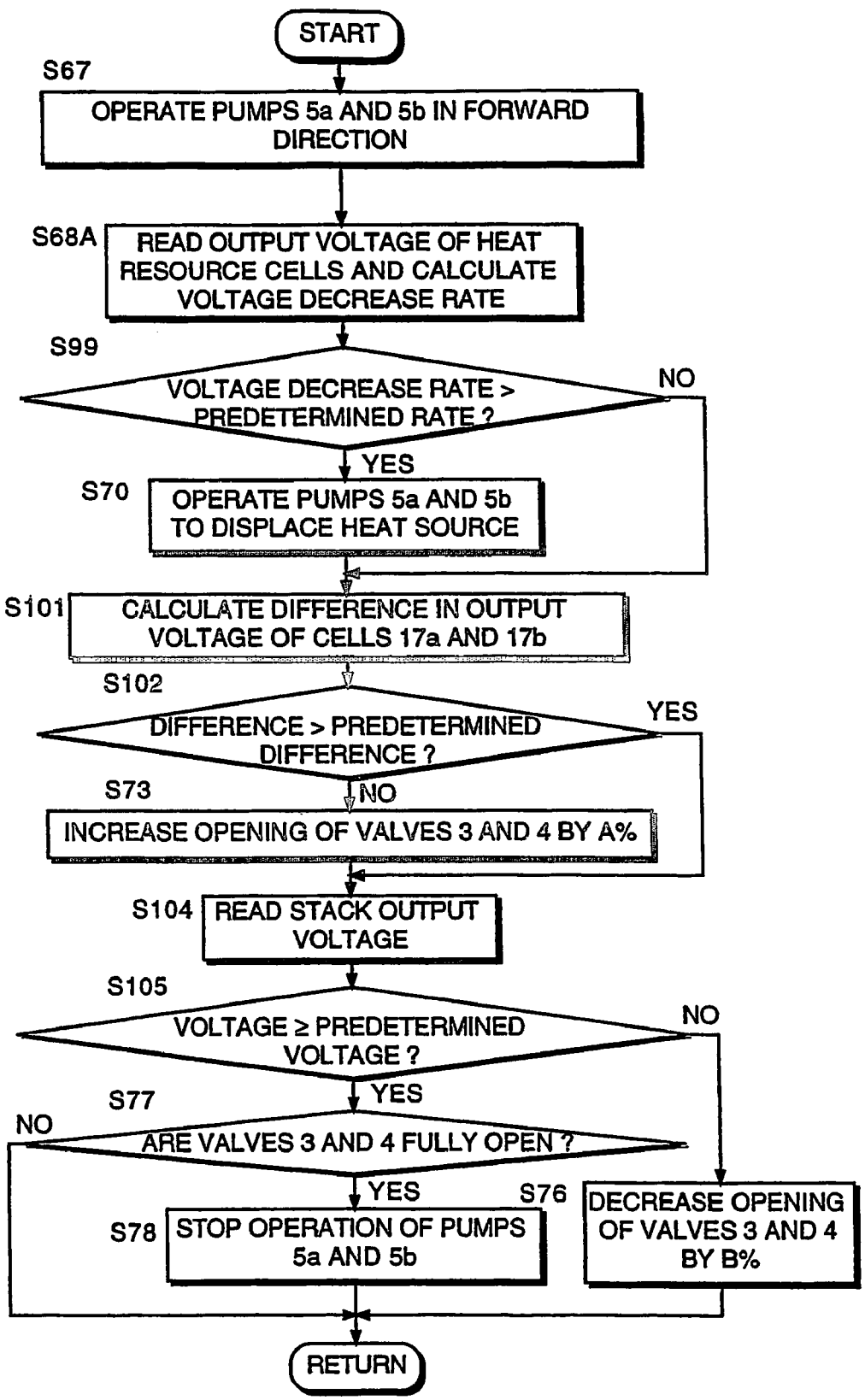
FIG. 21 is a flow chart describing a subroutine performed by the controller according to the seventh embodiment of this invention, when it executes the routine of FIG. 8.
Figure 22:
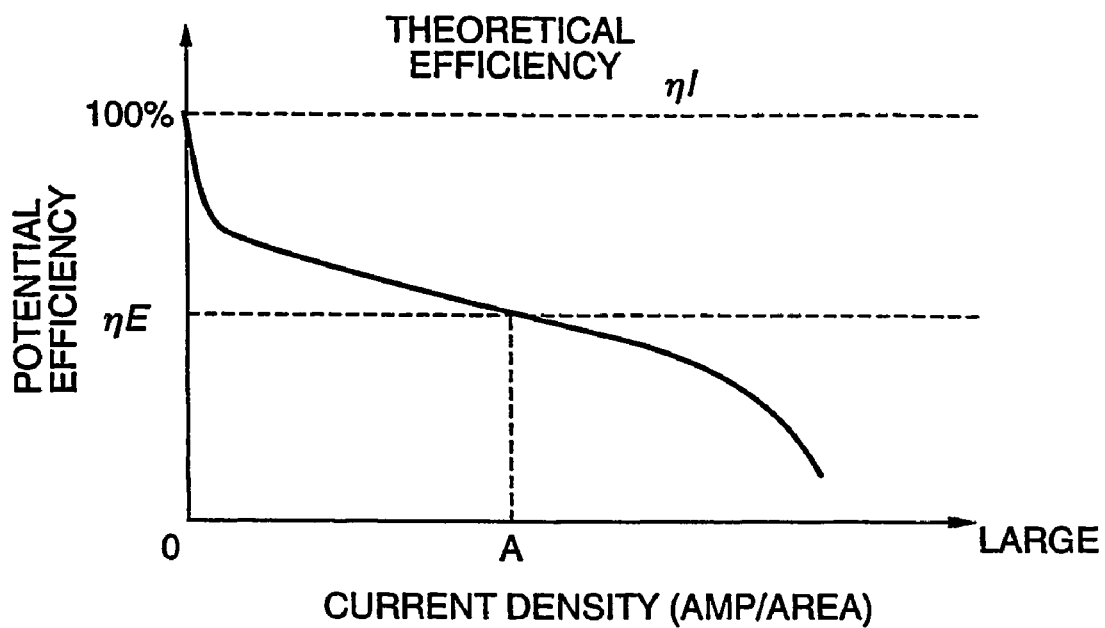
FIG. 22 is a diagram describing the relation of a current density and voltage efficiency of the fuel cell stack which can be used to estimate a temperature change, by the controller according to the seventh embodiment of this invention.
Figure 23:
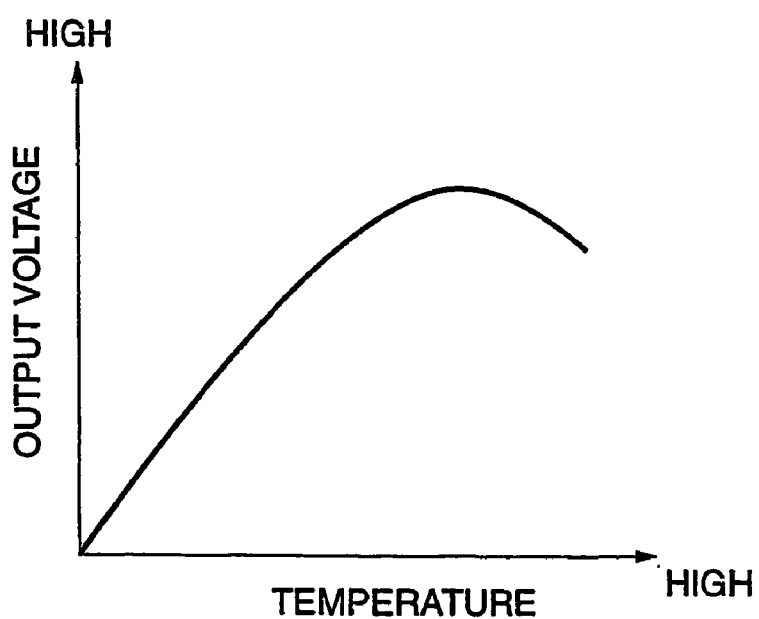
FIG. 23 is a diagram describing the relation of a temperature and power generation efficiency of the fuel cell stack which can be used to estimate the temperature change, by the controller according to the seventh embodiment of this invention.

Instead of the subroutines of FIG. 7 and FIG. 9 of the third embodiment, it is possible to perform the subroutine of FIGS. 19A and 19B, and the subroutine of FIG. 21.

In this embodiment, the voltage sensor 24a which detects the output voltage of the fuel cell stack 1 may be omitted. In the fuel cell stack 1, the current density and potential efficiency have the relation shown in FIG. 22. The output voltage Vfc and temperature Tfc of the fuel cell stack 1 have the relation shown in FIG. 23. Therefore, the output voltage Vfc can be calculated from the detected output current Ifc, and the temperature Tfc of the fuel cell stack 1.

According to this embodiment, heat generated in the fuel cell stack 1 is represented by the product R0·Ifc, but, in general, as the output voltage Vfc increases, the heat amount generated in the fuel cell stack 1 also increases. It is therefore possible to determine if the also possible to consider in the step S94 that the fuel cell stack 1 is generating sufficient amount of heat when the increase in the output voltage Vfc is larger than a predetermined value, and the heat amount generated in the fuel cell stack 1 is not sufficient when the increase in the output voltage Vfc is larger than the predetermined value.

By applying this criterion to the determination of the step S94, it is possible to omit the current sensor 25, thereby the construction of the fuel cell system is simplified.

Figure 24:
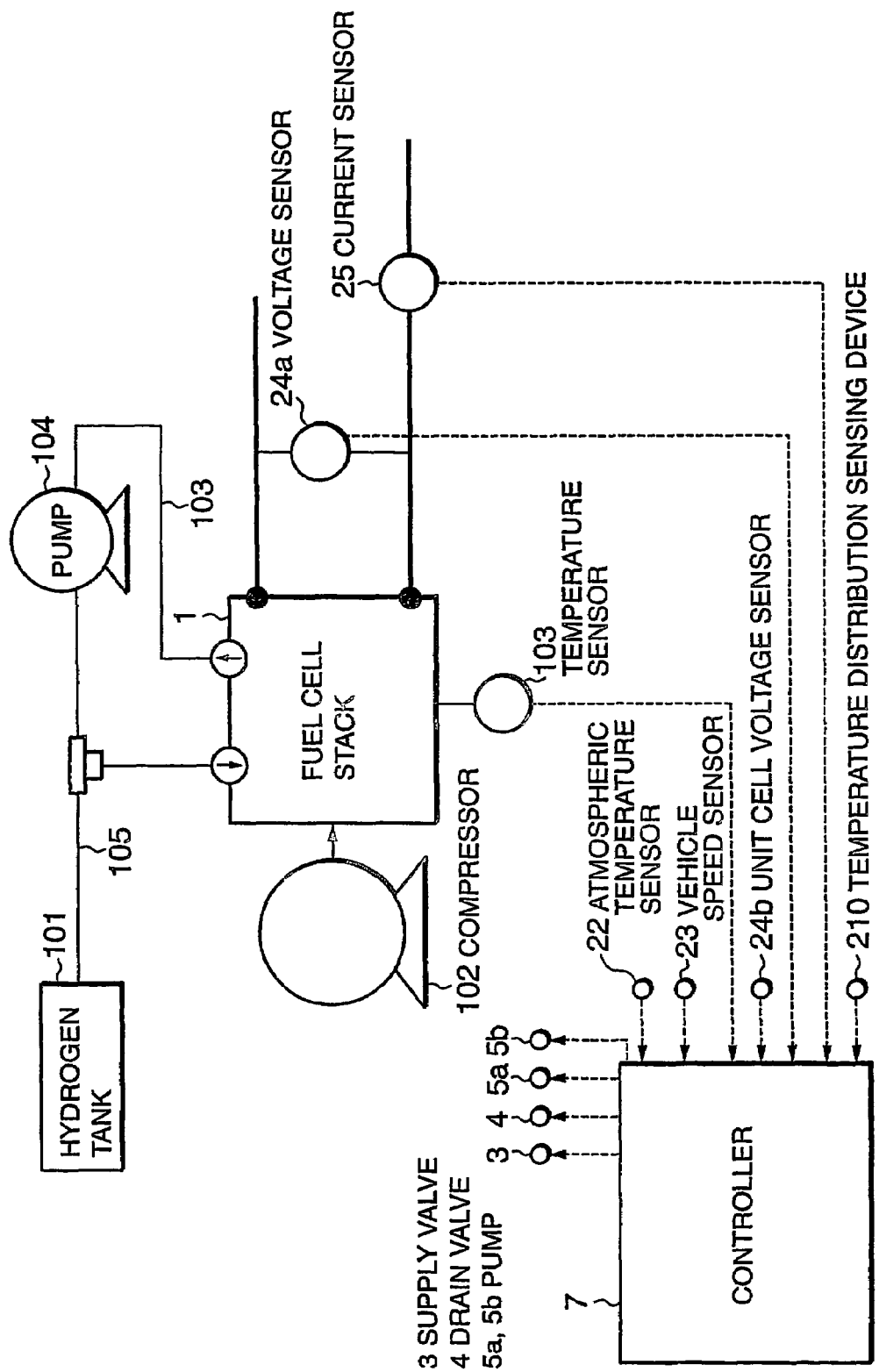
FIG. 24 is a schematic diagram of a fuel cell system provided with a hydrogen recirculation device, to which the seventh embodiment can also be applied.

This embodiment may also be applied to a fuel cell stack provided with a hydrogen recirculation device as shown in FIG. 24.

Referring to FIG. 24, the fuel system comprises a recirculation passage 106 provided with a pump 104 that recirculates an anode effluent discharged from the fuel cell stack 1 to a hydrogen supply passage 105 connecting the hydrogen tank 101 and the fuel cell stack 1. This embodiment can be applied without modification to such a fuel cell system.

The contents of Tokugan 2003-080219, with a filing date of Mar. 24, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the above embodiments, the bypass passages 14a and 14b were formed in the current collectors 2, but the bypass passages 14a and 14b may for example be formed inside an electrode plate which extracts electricity from the laminate 170.

INDUSTRIAL FIELD OF APPLICATION

As described above, according to this invention, the temperature inside the fuel cell stack can be equalized and the temperature of the fuel cell stack can be controlled to a desirable temperature within a short time period and with small energy. Therefore, a particularly desirable effect is obtained when this invention is applied to a fuel cell system for driving a vehicle wherein the temperature environment varies considerably.

The embodiments of this invention in which an exclusive property or privilege is claimed are defined as follows:

1. A fuel cell system, comprising:
a laminate of unit cells, each unit cell comprising a coolant passage;
a coolant supply manifold passing through the laminate, which distributes coolant from a coolant recirculation device provided outside the laminate to the coolant passages of the unit cells;
a coolant discharge manifold passing through the laminate, which recovers coolant from the coolant passages of the unit cells to the coolant recirculation device;
a valve which shuts off circulation of the coolant between the laminate and the coolant recirculation device; and
a bypass passage connecting the coolant supply manifold and the coolant discharge manifold, wherein the bypass passage has a larger cross-section than a cross-section of the coolant passages.

2. The fuel cell system as defined in claim 1, wherein the valve comprises a valve which shuts off the connection between the coolant supply manifold and the coolant recirculation device.

3. The fuel cell system as defined in claim 1, wherein the valve comprises a valve which shuts off the connection between the coolant discharge manifold and the coolant recirculation device.

4. The fuel cell system as defined in claim 1, wherein the unit cells comprise a first unit cell situated in a center portion in the lamination direction of the laminate, and a second unit cell situated in another portion including ends of the laminate, and a circulation resistance of the coolant passage of the first unit cell is set to be less than a circulation resistance of the cooling passage of the second unit cell.

5. The fuel cell system as defined in claim 4, wherein the laminate has a vertical cross-section in a direction of lamination in which the center portion of the laminate is situated lower than both ends of the laminate.

6. The fuel cell system as defined in claim 4, wherein the fuel cell system further comprises a pair of grip members which grip the laminate, and the bypass passage comprises a bypass passage formed inside one of the grip members, and a bypass passage formed inside the other of the grip members.

7. The fuel cell system as defined in claim 6, wherein the fuel cell system further comprises a pump which recirculates the coolant in a coolant recirculation passage including the coolant supply manifold, the coolant discharge manifold, and the bypass passage.

8. The fuel cell system as defined in claim 7, wherein the fuel cell system further comprises a temperature sensor which detects a temperature of the laminate, and a programmable controller programmed to control a discharge flow rate of the pump based on the temperature of the laminate.

9. The fuel cell system as defined in claim 8, wherein the controller is further programmed to open and close the valve based on the temperature of the laminate.

10. The fuel cell system as defined in claim 9, wherein the fuel cell system further comprises a temperature deviation detection sensor which detects a temperature deviation inside the laminate, and the controller is further programmed to vary an opening of the valve based on the temperature deviation inside the laminate.

11. The fuel cell system as defined in claim 10, wherein the temperature deviation detection sensor comprises a sensor which detects a temperature of the first unit cell, and a sensor which detects a temperature of the second unit cell.

12. The fuel cell system as defined in claim 7, wherein the fuel cell system further comprises a voltage sensor which detects a power generation voltage of the laminate, and a programmable controller which controls a discharge flow rate of the pump based on the power generation voltage of the laminate.

13. The fuel cell system as defined in claim 1, wherein a pair of bypass passages are formed in the laminate, one of the bypass passages connecting an end of the coolant supply manifold and an end of the coolant discharge manifold, and the other of the bypass passages connecting another end of the coolant supply manifold and another end of the coolant discharge manifold, wherein the bypass passages have a larger cross-section than a cross-section of the coolant passages.

* * * * *